United States Patent [19]

Arbuckle

[11] Patent Number: 5,842,194
[45] Date of Patent: Nov. 24, 1998

[54] METHOD OF RECOGNIZING IMAGES OF FACES OR GENERAL IMAGES USING FUZZY COMBINATION OF MULTIPLE RESOLUTIONS

[75] Inventor: Thomas D. Arbuckle, Tokyo, Japan

[73] Assignees: Mitsubishi Denki Kabushiki Kaisha; Real World Computing Partnership, both of Tokyo, Japan

[21] Appl. No.: 508,889

[22] Filed: Jul. 28, 1995

[51] Int. Cl.$^6$ .................................................. G06F 15/18
[52] U.S. Cl. ........................... 706/52; 706/2; 382/224
[58] Field of Search ........................ 395/10, 2.45, 2.65, 395/326, 3, 24; 382/125, 212, 156, 224; 706/45, 52, 2, 26

[56] References Cited

U.S. PATENT DOCUMENTS

| | | | |
|---|---|---|---|
| 4,641,349 | 2/1987 | Flom et al. | 382/117 |
| 5,012,522 | 4/1991 | Lambert | 382/118 |
| 5,063,603 | 11/1991 | Burt | 382/115 |
| 5,075,871 | 12/1991 | Weidman | 395/24 |
| 5,291,560 | 3/1994 | Daugman | 382/117 |
| 5,309,228 | 5/1994 | Nakamura | 358/500 |
| 5,440,662 | 8/1995 | Sukkar | 395/2.45 |
| 5,497,430 | 3/1996 | Sadovnik et al. | 382/156 |
| 5,499,319 | 3/1996 | Sultan et al. | 395/3 |
| 5,572,597 | 11/1996 | Chang et al. | 382/125 |
| 5,579,471 | 11/1996 | Barber et al. | 395/326 |
| 5,583,950 | 12/1996 | Prokoski | 382/212 |
| 5,608,841 | 3/1997 | Tsuboka | 395/2.65 |

FOREIGN PATENT DOCUMENTS

| | | |
|---|---|---|
| 2101586 | 4/1990 | Japan . |
| 2101591 | 4/1990 | Japan . |

OTHER PUBLICATIONS

Chow et al., "Towards a System for Automatic Facial Feature Detection"; Pattern Recognition, vol. 26, No. 12, pp. 1739–1755, 1993.

Huang et al., "Automatic Feature Point Extraction on a Human Face in Model Based Image Coding"; Optical Engineering, vol. 37, No. 7, pp. 1571–1580, 1993.

Gordon et al., "Application of Morphology to Feature Extraction for Face Recognition"; Proceedings of SPIE, vol. 1658, pp. 151–164, 1992.

Stringa, Luigi, "Eyes Detection for Face Recognition"; Applied Artificial Intelligence, vol. 7, No. 4, pp. 365–382, 1993.

Rybak et al., "Behavioral Model of Visual Perception and Recognition"; Proceedings of SPIE, vol. 1913, pp. 548–560, 1993.

(List continued on next page.)

*Primary Examiner*—Tariq R. Hafiz
*Assistant Examiner*—Sanjiv Shaw
*Attorney, Agent, or Firm*—Leydig, Voit & Mayer

[57] ABSTRACT

A system comprising a neural network, or computer, implementing a feature detection and a statistical procedure, together with fuzzy logic for solving the problem of recognition of faces or other objects) at multiple resolutions is described. A plurality of previously described systems for recognizing faces (or other objects) which use local autocorrelation coefficients and linear discriminant analysis are trained on a data set to recognize facial images each at a particular resolution. In a second training stage, each of the previously described systems is tested on a second training set in which the images presented to the previously described recognition systems have a matching resolution to those of the first training set, the statistical performance of this second training stage being used to train a fuzzy combination technique, that of fuzzy integrals. Finally, in a test stage, the results from the classifiers at the multiple resolutions are combined using fuzzy combination to produce an aggregated system whose performance is higher than that of any of the individual systems and shows very good performance relative to all known face recognitior systems which operate on similar types of training and testing data, this aggregated system, however, not being limited to the recognition of faces and being able to be applied to the recognition of other objects.

25 Claims, 11 Drawing Sheets

OTHER PUBLICATIONS

Solheim et al., "The Potentail in Using Backpropagation Neural Networks for Facial Verification Systems"; Simulation, vol. 58, No. 5, pp. 306–310, 1992.

Ying et al., "The Extraction and Recognition of Facial Images in the Complex Background"; Journal of the Faculty of Engineering, Sinshu Univ., vol. 74, pp. 77–87, 1994.

Soulie et al., "Multi–Modular Neural Network Architectures: Applications in Optical Character and Human Face Recognition"; International Journal of Pattern Recognition and Artificial Intelligence, vol. 7, No. 4, pp. 721–755, 1993.

Valentin et al., "Connectionist Models of Face Processing: A Survey"; Pattern Recogntion vol. 27, No. 9, pp. 1209–1230, 1994.

Turk et al., "Face Processing Models for Recognition"; Proceedings of SPIE, vol. 1192, No. 1, pp. 22–32, 1990.

Akamatsu et al., "A Robust Face Identification Scheme–KL Expansion of an Invariant Feature Space"; Proceedings of SPIE, vol. 1607, pp. 71–84, 1991.

Bichsel et al., "Human Face Recognition and the Face Image Set's Topology"; GVGIP Image Understanding, vol. 59, No. 2, pp. 254–261, 1994.

Hong, Zi–Quan, "Algebraic Feature Extraction of Image for Recognition"; vol. 24, No. 3, pp. 211–219, 1991.

Liu et al., "Human Face Recognition Method Based on the Statistical Model of Small Sample Size"; Proceedings of SPIE, vol. 1607, pp. 85–95, 1991.

Cheng et al., "A Novel Feature Extraction Method for Image Recognition Based on Similar Discriminant Function"; Pattern Recognition, vol. 26, No. 1, pp. 115–125, 1993.

Liu et al., "Novel Approach to Human Face Recognition" Proceedings of SPIE, vol. 1771, pp. 605–611, 1993.

Spacek et al., "Face Recognition Through Learned Boundary Characteristics"; Applied Intelligence, vol. 8, No. 1, pp. 149–164, 1994.

Samaria et al., "HMM–based Architecture for Face Identification" Image and Vision Computing, vol. 12, No. 8, pp. 537–543, 1994.

Samal et al., "Automatic Recognition and Analysis of Human Faces and Facial Expressions: A Survey"; Pattern Recognition, vol. 25, No. 1, pp. 65–77, 1992.

Choquet, Gustave, "Theory of Capacities"; Annales de l'Institut Fourier 5, pp. 131–295, 1953.

Tahani et al., "Information Fusion in Computer Vision Using the Fuzzy Integral"; IEEE Transactions on Systems, Man, and Cybernetics, 20(3) pp. 733–741, 1990.

Keller et al., "Information Fusion via Fuzzy Logic in Automatic Target Recognition"; Proceedings of the SPIE, 1623, pp. 203–208, 1992.

Keller et al., "The Fuzzy Integral and Image Segmentation"; Proceedings NAFIPS–86, New Orleans, pp. 324–338, Jun. 1986.

Grabisch, "Characterization of Fuzzy Integrals Viewed as Aggregation Operators"; 3rd Congress on Fuzzy Sets and Systems, Orlando, Jun. 1994.

Grabisch, "Fuzzy Integral in Multicriteria Decision Making"; Fuzzy Sets and Systems, Special Issue on IFSA Congress, 1994.

Yoneda et al., "Interactive Determination of a Utility Function Represented as a Fuzzy Integral"; Information Sciences, vol. 71, pp. 43–64, 1993.

Otsu et al., "A New scheme for Practical Flexible and Intelligent Vision Systems"; Proceedings of the IAPR Workshop Computer Vision, pp. 431–435, 1988.

Kurita et al., "A Face Recognition Method Using Higher Order Local Autocorrelation and Multivariate Analysis"; Proceedings of the 11th IAPR International Conference on Pattern Recognition, pp. 213–216, 1991.

Goudail et al., "Real Time Face Recognition Using High Order Autocorrelations"; Proceedings of the IEICE Spring Meeting, pp. 7–277, 1993.

Goudail et al., "Fast Face Recognition Method Using High Order Autocorrelations"; Proceedings of the International Joint Conference on Neural Networks, Nagoya, pp. 1297–1300, 1993.

Duda et al., "Pattern Classification and Scene Analysis"; Wiley Interscience, pp. 118–121, 1973.

Arbuckle et al., "Face Recognition System Incorporating Classifier Combination by Fuzzy Integral"; Proceedings of the 3rd International Conf. on Fuzzy Logic, Neural Nets & Soft Computing, IIZUKA, pp. 393–394, Aug. 1994.

Takahashi, et al., "Description and Matching of Density Variation for Personal Identification through Facial Images"; Proceedings of SPIE, vol. 1360, No. 3, pp. 1694–1704, 1990.

Arbuckle et al., "Multi–Resolution Face Recognition System Incorporating Fuzzy Integration"; Proceedings of the IEICE General Conference, Fukuoka, Systems vol. 2, pp. 252, Mar. 1995.

Iwamoto et al., "Classifier System for Visual Images"; Real World Computing Technical Report TR–94001.

Xu et al., "Methods of Combining Multiple Classifiers and Their Applications to Handwriting Recognition"; IEEE Transactions on Systems, Man and Cybernetics, vol. 22, pp. 419–435, 1992.

Jianchang et al., Artificial Neural Network for feature extraction and multivariate data projection, IEEE transactions on neural networks, pp. 296–370, Mar. 1995.

Smith et al., Transform features for texture classification and discrimination in large databases, Proceedings ICIP–94, pp. 407–411. Nov. 16, 1994.

Jianchang et al., Discriminant Analysis Networks, Neural Nets 1993 International conference, pp. 300–305.

METHOD OF RECOGNIZING IMAGES OF FACES OR GENERAL IMAGES USING FUZZY COMBINATION OF MULTIPLE RESOLUTIONS

BACKGROUND OF THE INVENTION

1. Field of the invention

The present invention relates to a method of recognizing images of faces or other images.

2. Description of the Related Art

The requirements for a general face or image recognition system will first be explained. Given a series or several series of digitized images of multiple faces (or other objects) to be recognized, the system first analyzes or acquires knowledge of these images in some way. This is called the training stage. The training stage allows the system to store a characterization of the images which is sufficient to distinguish these images from other images of other faces (or other objects) and from each other if the characterization is a good one. The initial series of images are grouped into sets corresponding to faces (or other objects) belonging to distinct persons (or instances of objects). In some cases, the characterization of the image is insufficient to perform the identification of the images and misclassification may result. The training stage may itself be divided into several distinct phases. There follows a testing stage. Supplied with a single new image or a series of new images of faces (or other objects) which may or may not have been previously made known to the system, the system is required to state for each of the new images whether these new images are of faces (or other objects) shown to it in the training stage and if so, to which one of these faces (or other objects) does the image bear the greatest resemblance. If there is insufficient similarity between the test image or test images and the images characterized by the system in the training stage, the system is required to reject those faces (or other objects) having a low degree of similarity to those known to it, such images of faces (or other objects) being referred to as unknown. The present invention is designed to solve this general face recognition problem or a problem similar to it in which images of objects other than faces are to be recognized.

For the purposes of discussion, it is convenient to break down the list of prior art into five separate sub-lists corresponding to the overall methodology used. The five topic areas are:

1). the detection of physical features within the face;
2). the direct application of neural network technology;
3). differencing between sequential video frames;
4). forms of traditional image processing;
5). applications of fuzzy algorithms to information fusion.

The method employed in the invention is most closely related to topic areas 4 and 5 of this list. Prior art relating to the field of face and object recognition will now be discussed.

Algorithms and references which are not specifically image processing or fuzzy logic related but may be used for face recognition or the recognition of objects are now listed with some brief explanation. This corresponds to topic areas 1 to 3 in the above list.

Chow and Xiaobo in "Towards a system for automatic facial feature detection" (Pattern Recognition, volume 26 number 12, pp 1739–1755, 1993) have used the Hough transform and deformable template matching to locate facial features within images. Their technique can be used for locating faces within digitized images. Huang, Ming, Ja-ling in "Automatic feature point extraction on a human face in model based image coding" (Optical Engineering, volume 37, number 7, pp 1571–80, 1993) discuss a model-based coding scheme which can be used for the extraction of facial features such as eyebrows, eyes and facial outlines and could then be used for facial recognition. Gordon and Vincent in "Application of morphology to feature extraction for face recognition" (Proceedings of SPIE, volume 1658, pp 151–164, 1992) use morphological operators for feature extraction of human faces. They describe how to recognize connected part boundaries for convex structures as well as how to recognize connected ridge lines. Such procedures can be used for recognizing facial regions. Stringa in "Eyes detection for face recognitior" (Applied Artificial Intelligence, volume 7, number 4, pp 365–382, 1993) discusses a scheme for eye detection as well as its use in a system for recognition of facial images using correlation techniques.

For these techniques, those that can be used for recognition lack large scale tests with the exception of the system by Stringa. The work of Stringa is used for eye detection and the recognition system was based around the technique of using differences between successive video frames to determine a region of interest followed by histogramming of intensity values over a transformed image. This technique has the disadvantages of requiring multiple sequential images for localizing the region of interest and the technique is not directly used for face recognition.

U.S. Pat. No. 4,641,349 (Flom Leonard and Safir Aran) describes a method for identifying eyes, and, by implication, persons, animals or objects attached to these eyes. The pupils of the eyes are contracted to a predetermined size to permit a standard record of the iris to be made. Identification then follows from a comparison of the iris images. U.S. Pat. No. 5,291,560 (John G. Daugman) describes a method of identifying persons using the texture of the iris encoded into a compact "iris code". Pattern recognition is achieved by combining special signal processing methods with statistical decision theory. U.S. Pat. No. 5,012,522 (Laurence C. Lambert) describes an autonomous face recognition machine which is capable of locating human faces in video scenes with random content within two minutes, and capable of recognizing the faces that it locates. The basic method of operation is to identify gestalt faces and to compare the gestalt faces' detected facial characteristics with a stored set of facial characteristics of known human faces.

Of these three patents the two concerning recognition using information derived from images of irises have the obvious limitation that they require special and detailed images of the irises which cannot be derived from images such as would be produced by typical security cameras under normal conditions. The system by Lambert requires a sequence of video images and performs the recognition by using Gestalt faces. It therefore requires a number of video frames to locate the focus of attention and to identify the unknown face.

Rybak, Golovan and Gusakova in "Behavioral model of visual perception and recognition" (Proceedings of SPIE, volume 1913, pp 548–560, 1993) have used a system comprising a low-level neural module for attention focusing in conjunction with a high-level recognition module for recognizing complex objects such as faces. Solheim, Payne and Castain in "The potential in using backpropagation neural networks for facial verification systems" (Simulation, volume 58, number 5, pp 306–310, 1992) have used neural networks trained on pixel vectors formed from compressed facial images for face recognition. Ying, Nakano and Miyao in "The extraction and recognition of facial images in the complex background" (Journal of the Faculty of Engineering, Shinshu University, volume 74, pp 77–87, 1994) used a facial texture model whose coefficients were derived by perceptron-type learning. Soulie, Viennet and Lamy in "Multi-modular neural network architectures: applications in optical character and human face recognition" (International Journal of Pattern Recognition and Artificial Intelligence, volume 7, number 4, pp 721–755, 1993) describe the integration of several neural networks into a pattern recognition system which is globally trained. The use of neural networks for face recognition has been reviewed by Valentin, Abdi, O'Toole and Cottrell in "Connectionist models of face processing: a survey" (Pattern Recognition volume 27, number 9, pp 1209–1230, 1994).

The difficulty in using neural techniques for recognition lies in the large number of test images required and the long training times used in order to teach the network the image information. However, they do have the advantage that they are able to adapt to changing information and are able to learn new tasks.

U.S. Pat. No. 5,309,228 (Hiroaki Nakamura) describes a method of extracting feature image data and a method of extracting a person's face data. An original color image is divided into a plurality of elements, resolving these elements into red, green and blue components, wherein each of these said colors is photometrically measured, obtaining color regions of the same or similar hue, inscribing circles or ellipses inscribed with respect to the boundary portions of the obtained color regions and dividing the color regions obtained using circular or elliptic regions starting from the largest circle or ellipse in order to thereby obtain a plurality of regions and selecting at least one of the divided regions from which to extract the data of the selected region as human face image data.

The system by Nakamura relies on the calculation of elliptical or circular regions from histogramming data. It is likely that this method would be confused in complex backgrounds. In any case, once the segmentation is obtained variations in the segmentation between different images of the same person or object will result in different segmented regions, thus affecting the performance of the recognition system. Color images of the faces are also required.

U.S. Pat. No. 5,063,603 (Peter J. Burt) describes a method for recognizing objects and an image processing system therefor. By examining a time series of images of successively higher resolutions in which each frame of the image may or may not contain an image of a particular person, the earlier low-resolution frames may be used in determining areas of interest for characterization at higher resolutions. By adding additional data at higher and higher resolutions, the system is eventually able to recognize or reject images based on thresholding of the probabilities that the image does or does not contain a previously identified person.

The system by Burt requires a sequence of video frames in order to locate the person to be identified. In addition, the patent is not particularly concerned with the actual mechanism by which the recognition is performed.

Algorithms which also apply image processing techniques to face recognition and have been used for this task will now be described with the exception of the algorithm closest to that of the invention. This corresponds to topic area 4 in the above list.

Turk and Pentland in "Face processing models for recognition" (Proceedings of SPIE, volume 1192, number 1, pp 22–32, 1990) discuss the use of eigenfaces for face recognition. This technique is currently one of the most commonly used techniques in the field of face recognition. A refinement of the eigenface technique is given by Akamatsu, Sasaki, Fukamachi and Suenaga in "A robust face identification scheme—KL expansion of an invariant feature space" (Proceedings of SPIE, volume 1607, pp 71–84, 1992). Bichsel and Pentland have used a scale space matching technique for face recognition and tracking in three dimensions as discussed in "Human face recognition and the face image set's topology" (CVGIP Image Understanding, volume 59, number 2, pp 254–261 1994).

The eigenface technique works very well for recognizing faces provided that the facial images can be correctly aligned and scaled in advance. This problem is well known. The scale space matching technique is designed for use with sequences of images in order to employ coarse-to-fine searches in parameter space. The face recognition performed is to detect whether or not the presented image is a face or some other object. No tests of the discriminatory power of the algorithm were presented.

Hong discusses the use of singular value decompositions for object recognition in "Algebraic feature extraction of image for recognition" (Pattern Recognition, volume 24, number 3, pp 211–219, 1991). His classification procedure acts on data whose dimension has been reduced by means of the Foley-Sammon transform which is very similar, if not identical to the technique referred to as linear discriminant analysis. However, the publication deals only with analysis at a single resolution. The works of Cheng, Liu, Yang, Yong-Ming, Yan-Chun "Human face recognition based on the statistical model of small sample size" (Proceedings of SPIE, volume 1607, pp 85–95, 1992), Cheng, Liu and Yang "A novel feature extraction method for image recognition based on similar discriminant function" (Pattern Recognition, volume 26, number 1, pp 115–125, 1993) and Liu, Jallut, Ying-Jiang, Yong-Qing, Ying-yu "Novel approach to human face recognition" (Proceedings of SPIE, volume 1771, pp 605–611, 1993) are similar to that published by Hong.

These techniques are only being used at a single resolution. Moreover, their performance with large sample sizes has not been shown to be effective.

Takahashi, Sakaguchi, Minami, Nakamura "Description and matching of density variation for personal identification through facial images" (Proceedings of SPIE, volume 1360, number 3, pp 1694–1704, 1990) discuss the use of isodensity lines for human face recognition. Spacek, Kubat and Flotzinger "Face recognition through learned boundary characteristics" (Applied Artificial Intelligence, volume 8, number 1, pp 149–164, 1994) discuss a face recognition system which learns to improve its recognition performance. Samaria and Young in "HMM-based architecture for face identification" (Image and Vision Computing, volume 12, number 8, pp 537–543, 1994) describe the use of hidden Markov models for modeling the statistics of facial images. They also show how a hidden Markov model can also be used for segmenting images and for detecting features that can then be used for identification. Much of the previous work on face recognition is described by Samal and Iyengar in "Automatic recognition and analysis of human faces and facial expressions: a survey" (Pattern Recognition, volume 25, number 1, pp 65–77, 1992).

The use of isodensity lines for recognition requires that the image and the test image be similarly scaled and aligned and thus suffers from the same problems as the eigenface technique. Hidden Markov models are known to be computationally intensive and to take a long time to process. Their probabilistic nature means that the eventual segmentation or recognition result is not deterministic.

The U.S. Pat. Nos. 5,063,603, 4,641,349, 5,291,560, 5,012,522, 5,309,228 are again referenced here as relevant to the identification of faces using pattern recognition techniques.

Prior art employing fuzzy logic for the combination of information is now listed. This corresponds to topic area 5 in the above list of methods.

Fuzzy integrals are a means of combining information which takes the importance of the sources of information into account. They have found application in many areas because they are easy to compute although they do require a training stage in which the relative importance of each of the sources is determined. Two types of fuzzy integral are described in references by Choquet and by Sugeno. The Choquet integral is defined by Choquet in "Theory of Capacities" (Annales de l'Institut Fourier 5, pp 131–295, 1953) and the Sugeno Integral by Sugeno in "Theory of fuzzy integrals and its applications" (Ph.D. Thesis, Tokyo Institute of Technology, 1974).

Suppose we have a set of formation sources $X=\{x_1, x_2, \ldots, x_m\}$. Each of these sources provides a measurement of some phenomenon. We will denote the measurements by $h(x_i)$ for source $x_i$. Denote by $$A_i = \{x_i, x_{i+1}, \ldots, x_m\} \quad (1)$$

the set of the last m−i+1 sources in X and similarly $$A_{(i)} = \{x_{(i)}, x_{(i+1)}, \ldots, x_{(m)}\} \quad (2)$$

the set of the last m−i+1 sources in X in which the indices of the elements of X have been permuted so that $h(x_4) \leq h(x_2) \leq \ldots h(x_m)$. (In other words, $A_{(i)}$ is the set of the last m−i+1 sources when the sources are ordered in increasing size of measurement.) Denote the maximum and minimum operations by V and $\Lambda$ respectively. The Sugeno integral of a function h with respect to a fuzzy measure g over the set of sources X is defined by $$S_g(h(x_1), h(x_2), \ldots, h(x_m)) = \bigvee_{i=1}^{m} h(x_{(i)}) \Lambda g(A_{(i)}) \quad (3)$$

where h:X−[0,1]. The Choquet integral for a function h with respect to g is given by $$C_g(h(x_1), h(x_2), \ldots, h(x_m)) = \sum_{i=1}^{m} (i(x_{(i)}) - h(x_{(i-1)}) \cdot g(A_{(i)})) \quad (4)$$

where this time $h: X \to \Re$. (To satisfy the formalism it is necessary to define $h(x_0)=0$.) Determination of the fuzzy measure g is carried out by training on test data. The fuzzy measure g is a set function whose value gives a measure of importance to the set of sources given as its argument.

The invention will use the $g_{80}$-fuzzy measure of Sugeno. For m information sources, m coefficients giving the reliability of each source are required. Fuzzy densities $g^i$ are defined by $g^i = g(\{x_i\})$ and are a measure of source reliabilities. Using the properties of the $g_\lambda$-fuzzy measure, the other $2^m$-m coefficients of the fuzzy measure are then automatically determined.

A fuzzy measure g defined on X is a set function such that $g(A) \to [0,1]$, with A some subset of X, which is defined to have the following properties.

$$g(\phi)=0 \quad (5)$$

$$g(X)=1 \quad (6)$$

$$A \subseteq B \Rightarrow g(A) \leq g(B) \quad (7)$$

A $g_\lambda$-fuzzy measure is a fuzzy measure, which obeys the following condition.

$$g(A \cup B) = g(A) + g(B) + \lambda g(A) g(B), \lambda > -1 \quad (8)$$

where A, B are members of the power set of X, the set of sources.

If $\lambda=0$, g reduces to a probability measure and obeys the following equation.

$$\sum_{i=1}^{m} g(\{x_i\}) = 1 \quad (9)$$

For all other cases, since g(X)=1 by definition, we can determine $\lambda$ by solving the equation $$\prod_{i=1}^{m} (1 + \lambda g^i) = \lambda + 1 \quad (10)$$

which is found by repeated application of formula (8) to the set of fuzzy densities. Expanding this expression always results in a m−1 order polynomial in $\lambda$. In other words, determination of $\lambda$ involves, in general, the solution of an m−1 order polynomial equation. Such an equation has m−1 roots. However, we can use the following result to determine the unique non-zero $\lambda$ in the required interval. It can be shown that for a fixed set of fuzzy densities $\{g^i\}$, $g^i \in (0,1)$, $\forall i$, there exists a unique $\lambda \in (-1, \infty)$, $\lambda \neq 0$ which satisfies equation (10). It can be further shown that equation (10) is positive, increasing and concave up in the interval $(-1, \infty)$, and that the line $\lambda+1$ crosses It at zero and exactly one other place. Thus, to find all coefficients characterizing a fuzzy measure g given its fuzzy densities $g^i$, one simply solves equation (10) for the unique non-zero root in the interval $(-1, \infty)$ to determine $\lambda$. Once $\lambda$ is known, all of the coefficients of the fuzzy measure g can be calculated from formula (8).

Uses of the Sugeno integral for information fusion in vision systems are described by Tahani and Keller in "Information Fusion in Computer Vision Using the Fuzzy Integral" (IEEE Transactions on Systems, Man, and Cybernetics, volume 20, number 3, pp 733–741, 1990). Details of the calculation of fuzzy integrals and the result by which the Sugeno fuzzy density measure g is calculated from fuzzy densities are also listed ;in this reference. The means of calculation of the fuzzy densities for each of the sources will be discussed in the section which describes the invention. Other references concerning the use of fuzzy integration in vision systems are those by Keiler, Krishnapuram and Hobson, "Information Fusion via fuzzy logic in automatic target recognition", Proceedings of the SPIE, volume 1623, pp 203–208, 1992), and by Keller, Qiu and Tahani, "The Fuzzy Integral and Image Segmentation". (Proceedings NAFIPS-86, New Orleans, pp 324–338, June 1986). Characterizations of various fuzzy integrals are given by Grabisch in "Characterization of fuzzy integrals viewed as aggregation operators" (3rd IEEE Congress on Fuzzy Sets and Systems, Orlando, June 1994) and a list of industrial applications of fuzzy integrals are also given by Grabisch in "Fuzzy integral in multicriteria decision making" (Fuzzy Sets and Systems, Special Issue on IFSA Congress, 1994). A technique for training fuzzy integrals is given by Yoneda, Fukami, and Grabisch in "Interactive Determination of a Utility Function Represented as a Fuzzy Integral" (Information Sciences, volume 71, pp 43–64, 1993).

The conventional algorithm closest to that of the invention will now be explained. This algorithm is used to recognize faces at a single resolution.

The feature used in the face recognition process is that first described by Otsu and Kurita in "A new scheme for practical flexible and intelligent vision systems" (Proceedings of the IAPR Workshop on Computer Vision, pp 431–435, 1988). A more detailed description of the features and of their use in face recognition is given by Kurita, Otsu and Sato in "A Face Recognition Method Using Higher Order Local Autocorrelation and Multivariate Analysis" (Proceedings of the 11th IAPR International Conference on Pattern Recognition, pp 213–216, 1991). The technique of local autocorrelation coefficients is also the subject of two patents by Otsu. The patents are Japanese patents Heisei2-101586 (Otsu, 1990) and Heisei2-101591 (Otsu, 1990). This scheme has since been expanded and evaluated by Goudail, Lange, Iwamoto, Kyuma and Otsu in "Real Time Face Recognition Using High Order Autocorrelations" (Proceedings of the IEICE Spring Meeting, page labeled 7-277, 1993, and in a second reference by the same authors "Fast face recognition method using high order autocorrelations" (Proceedings of the International Joint Conference on Neural Networks, Nagoya, pp 1297–1300, 1993).

The process followed in the system previously described is shown schematically in FIG. 1a. In the training stage, given a series of gray-scale input images, each image is characterized using local autocorrelation coefficients to give a feature vector for each image. The inter- and intra-class covariance matrices of the feature vectors for the known training images are used to generate a feature mapping which maximizes the difference in feature vectors between each of the known classes (persons) while minimizing the differences between the features of faces of the same class (person). The analysis used to calculate this mapping is called linear discriminant analysis. The Euclidean distances between the centers of the clusters of mapped features for each class and the features for images belonging to the class are minimized. This principle is utilized in the recognition stage for the test images.

In FIG. 1b, the mapping found by linear discriminant analysis is applied to the training data to calculate the values of the vectors after the mapping transformation. The vectors for each class, that is the vectors which correspond to images from each face or person (or object if the method is not being used for face recognition), are averaged resulting in one mean vector for each known person (or object). This mean vector is referred to as the cluster center. It is an indicator of the center of the region in which mapped vectors corresponding to a known face are likely to be present.

In FIG. 1c, the procedure for recognizing test images, the test stage, is shown. By applying the mapping found in the training stage, the features for the unknown images are transformed in such a way that the distances between the transformed feature vectors for faces which were in the training set and the cluster centers for these faces is minimized. Thus recognition can be performed by thresholding the distance measurement between an unknown face and all of the cluster centers. The closest cluster center is the most likely candidate for the identity of the unknown face: if the distance exceeds some threshold, then the test face can be rejected as being unknown.

We now describe this procedure in more detail.

The autocorrelation coefficients are calculated by scanning the set of masks shown in FIG. 2 over the gray-scale image to be classified. The areas which are represented by black squares represent pixels whose mask has a numeric value of one whereas those represented by white squares have a mask of zero and are not used in the calculation for that coefficient. For each of the possible positions of the mask on the input image, the product of the image intensities for each of the black squares is calculated and the sum of these intensity products is then normalized so that all possible characterizations lie between zero and one. Thus the zeroth order local autocorrelation coefficient is the normalized mean of the intensity values of the image. The first and second order coefficients give information about the oriented correlations between pixels.

More precisely, suppose $f_{ij}$ is an 8 bit grayscale discrete image of dimension I=J. The autocorrelation kernels, κ, may be defined as sets of O(κ) couples $$(i_n, j_n) = \{-1, 0, 1\} * \{-1, 0, 1\} \quad (11)$$

where $O(\kappa) \in \{0,1,2\}$ is the order of the autocorrelation and each couple represents an offset from the central pixel. For example, using the representation in which the y-axis of the image is directed towards the bottom of the page and the x-axis towards the right, the second order kernel which is pictorially represented by a diagonal from top-left to bottom-right would be represented by $\{(-1, -1), (0,0), (1,1)\}$. For each of these kernels, we calculate the $O(\kappa)$th order autocorrelation coefficients using $$C_k = \frac{1}{N(\kappa)} \cdot \sum_{i=1}^{i=j} \sum_{j=2}^{j=i} \prod_{n=0}^{o(\kappa)} f_{i+i_n, j+j_n} \quad (12)$$

where $N(\kappa)$ is a normalizing constant given by $$N(\kappa) = \frac{1}{(I-2)(J-2)(2^8-1)^{o(\kappa)+1}} \quad (13)$$

where $N(\kappa)$ is a normalizing constant given by $$N(\kappa) = 1/(I-2)(J-2)(2^8-1)^{\cup(\kappa)-1} \quad (13)$$

and the coefficients $C_\kappa$ lie in the range [0,1]. Since there are one, four and twenty of the zeroth, first and second order coefficients respectively, concatenation produces a 25 element feature vector which is used to describe each image. The factor of $2^8-1$ corresponds to the use of an 8-bit gray-scale representation.

The method of linear discriminant analysis (or multiple discriminant analysis) is described by Duda and Hart in "Pattern Classification and Scene Analysis" (Wiley Interscience, pp 118–121, 1973.)

The inter-class scatter matrix is defined to be $$S_w = \sum_{i=1}^{c} S_i \quad (14)$$

where $$S_i = \sum_{x \in C_i} (x - m_i)(x - m_i)^T \quad (15)$$

where T denotes the transpose operation (to form the outer product); the vectors x are the feature vectors; $C_i$ are the c classes, each of which has $n_i$ members; and $m_i$ are the mean vectors for each class. That is $m_i$ are the cluster centers given by the following equation.

$$m_i = \frac{1}{n_i} \sum_{x \in C_i} x \quad (16)$$

The intra-class scatter matrix is defined by the following equation.

$$S_B = \sum_{i=1}^{c} n_i(m_i - m)(m_i - m)^T \quad (17)$$

It is shown by Duda and Hart that the transpose of the matrix whose columns are the eigenvectors $e_i$ of the generalized eigen-problem $$S_B e_i = \lambda S_w e_i \quad (18)$$

gives the optimal mapping. This mapping is the one used in the invention.

Previous descriptions of the invention and related material have appeared in the following two publications. Their publication date is less than one year before the submission of this patent. Arbuckle, Lange, Goudail, Iwamoto, Takahashi, Ishii, Mori, Kyuma, aid Otsu in "Face Recognition System Incorporating Classifier Combination by Fuzzy Integral" (Proceedings of the 3rd International Conference on Fuzzy Logic, Neural Nets and Soft Computing, IIZUKA, pp 393–394, August 1994) describe a system very similar to the invention. Arbuckle, Lange, Iwamoto, Otsu and Kyuma in "Multi-resolution Face Recognition System Incorporating Fuzzy Integration" (Proceedings of the IEICE General Conference, Fukuoka, Systems Volume 2, pp 252, March 1995) describe the invention.

An internal real world computing partnership memo on this topic by Iwamoto, Goudail, Lange, Arbuckle, Kyuma, Otsu "Classifier System for Visual Images" (Real World Computing Technical Report TR-94001) whose internal distribution date was more than one year before the submission of this patent but which was not presented for general publication, contains a description of an invention very similar to the one presented.

SUMMARY OF THE INVENTION

Accordingly, it is an object of the present invention to eliminate the above-described problems in the related art and to provide a novel and improved method of recognizing faces or other images.

To achieve this object, in one aspect of the present invention, there is provided a procedure for solving the problem of the recognition of faces or other images and a means of combining the results of the procedures. When presented with images of known persons (at least two), the number of images being sufficient to permit the application of the method termed linear discriminant analysis, these images are analyzed using a technique termed local autocorrelation coefficient feature analysis or, simply, local autocorrelation coefficients, this analysis resulting in a series of feature vectors, one feature vector for each image, which is then analyzed using the procedure termed linear discriminant analysis. The results of this analysis run on versions of the same image at multiple resolutions being combined by the technique called fuzzy integration in the forms termed Sugeno Integration or Choquet integration although other forms of integration may also be suitable for this purpose, the integration being with respect to a fuzzy measure, fuzzy measures including but not limited to the Sugeno measure. The fuzzy measure is itself generated by using a second training set of training images. The combined characterization may then be classified using a method called least distance classification in which the Euclidean distance of the mapped point from the points corresponding to the mapped average of the points for each person's face in the training date is calculated, the closest being taken as the most likely recognition result, rejection of unknown persons being implemented using thresholding of these distances or some other means of similar effect.

In another aspect of the present invention, there is provided a process for solving a problem of recognition of faces or other images. According to this process, captured images of persons to be identified are read, and then characterized using the method termed local autocorrelation coefficients. The characterization results in a vector of numbers which characterize the image. By shrinking (or expanding) the image different characterizations may be calculated, one for each resolution. These characterizations are then mapped or transformed into new vectors, this transformation corresponding to the mapping of the feature vectors from a feature space, a coordinate system, to a recognition space, a possibly different coordinate system. By comparing the locations of the mapped vectors in the recognition space with the transformed averaged features for images of known faces at the same resolution as the image to be tested, a series of distances can be calculated, each distance measuring the distance between the mapped or transformed point and the transformed cluster centers, the mapped averages of the feature vectors for each class of image in a training set. Taking these sets of distances for each image but calculated from the characterizations at many resolutions, the procedure of fuzzy integration is applied to yield a further set of differences, or alternatively a set of scores, whose value can be used in a similar way to distances to characterize the similarity of the image to known images. These distances or scores are then classified by picking the minimum distance (or possibly maximum score or the most suitable value of some function of these distances or scores) in order to determine the most likely identity of the person to be recognized and also in order to determine if the image (and its series of similar images of the same scene or person but at different resolutions) is in fact of a person or object not previously made known to the system, thus permitting both the recognition of known faces or objects and the rejection of unknown faces or objects.

In a third aspect of the present invention, there is provided a process for realizing a statistical procedure together with a means of combining the results of this statistical procedure whose method of operation is fuzzy integration. The system is provided with three sets of images of faces. For each image, corresponding images are calculated at differing resolutions or corresponding images at different resolutions are presented from some means of capturing images and digitizing them. The first of these sets of images comprises images of the persons who well be assumed known by the system. The second set of these images comprises different images of all of the persons in the first set together with images of persons not known to the system, the classification of known and unknown images also being known to the system in advance. The third set of these faces comprises a mixture of yet more images of persons known to the system, that is persons whose images are in the first training set of images, and images of persons who are not known to the system, not necessarily the same unknown persons who were present in the second set of images.

For the first of these sets of images, all of the images are classified using the method of local autocorrelation coefficients resulting in a classifying vector which describes each image at each resolution. At each resolution, applying the method of linear discriminant analysis (or multiple discriminant analysis as it is sometimes called) to the sets of images results in the calculation of a transformation matix, not necessarily a square matrix if the dimension of the characterizing vector is to be reduced in the transformation, which has the property of grouping the points belonging to each face (or class) more closely together, whilst, at the same time, maximizing the spread in the groupings or clusters which represent these known faces. Applying these mappings to the features for the training set at each resolution, the correct mapping matrix being used results in mapped feature vectors for each resolution. The cluster centers, that is the average of the mapped points for each of the images for each particular class or known face can then be calculated under that mapping. These cluster centers and this mapping are then used in the subsequent stages.

For the second of these sets of images, the performance of the system at each resolution is tested by classifying the new images using the technique called local autocorrelation coefficients, applying the corresponding mapping for that resolution and calculating the distances between the mapped feature and the cluster centers calculated in the previous stage. By employing the distances or some measures derived from these distances in conjunction with some thresholding technique, the percentage recognition rates and rejection rates for the system as trained on the first set of faces can be gauged by this test on the second set of faces. It is the performance of the system at each resolution which is used to generate the fuzzy densities used in combining the results from multiple resolutions. For each resolution and for each face, the recognition rate of the recognition system corrected for an error rate is used as the fuzzy density corresponding to the quality of the classifier at that resolution and on that known face.

Finally, for the third set of images, the images are again classified using the method of local autocorrelation coefficients and the mapping matrix derived in conjunction with the first set of images is used to transform the vectors into the mapped vectors in the usual way. The distances between the mapped image feature vectors and the cluster center are calculated as when used in conjunction with the second set of images. At each resolution, the distances between the mapped features for the face and between the cluster centers are calculated. These distances are then converted into scores by using a formula and these scores are combined using fuzzy integration of, for example, either the Sugeno or Choquet type, the fuzzy measure required for the calculation of the integrals coming from the percentage recognition rates corrected for an error rate and the formulas describing the Sugeno fuzzy density. This results in a single measurement for each image between it and between points representing the combined centers of the classes at the multiple resolutions. This measurement can then be used for recognition in the manner described previously, namely that some form of thresholding may be performed on some combination or function of the distances or scores or measures corresponding to each of the images to reject unknown faces, the optimal measurement corresponding to the known face.

In a fourth aspect of the present invention, there is provided a process for realizing a set of neural networks together with a means of combining their results whose method of operation is fuzzy integration. Given three sets of images, two for training and one for testing in which there is an overlap of faces in all three sets corresponding to face which are to be known to the system, once these faces at multiple resolutions have been classified by using local autocorrelation coefficients, or possibly using a neural network implementing characterization using local autocorrelation coefficients, the following procedure analogous to the previous ones can be used. For the first set of images, a neural network can be taught to perform the mapping previously carried out by the process and the application of the statistical procedure. Once the neural network has learned this mapping, the procedure can proceed as before. The mapping is applied to find the cluster centers; the mapping is applied to the second data set and the recognition and an error rate are determined; the measurements of recognition performance and of an error are combined to form the fuzzy measure, the fuzzy measure is used to combine the measurements produced at multiple resolutions and the combined results are then examined by some function which returns the optimal recognition result from the data given, and which applies some form of thresholding to permit the rejection of unknown faces. It is possible that a single neural network can be trained to both find the local autocorrelation coefficients and to perform the mapping at the same time.

Several additional objects and advantages of the present invention are:

a) to actually recognize facial images (or images of other classes of objects) as opposed to locating them in an image or performing some other form of preprocessing helpful in recognition;

b) to recognize facial images reliably when used with large data sets having a large number of classes (persons or classes of objects), as can be shown by statistical analysis of recognition and rejection rates of the present invention using images of over one hundred persons;

c) to perform recognition without the requirement of multiple sequential images for face localization within an image, although multiple images of faces are still required;

d) to perform recognition without the requirement of specialized images of irises or other body parts and to be able to perform the recognition from images of heads and upper torsos only;

e) to perform recognition without necessarily requiring the long training times required for neural network techniques;

f) to perform recognition without the requirement of using color images although color images could be used;

g) to use multiple resolutions concurrently (so far as is possible) in the recognition process rather than incrementally;

h) to perform recognition without the requirements that the facial images to be recognized are precisely aligned in some particular way;

i) to perform recognition without any requirement for the use of three dimensional information;

j) to perform recognition using multiple resolutions rather than one single resolution;

k) to perform recognition in a deterministic manner in that the results of tests of recognition performance using the same data return identical results l) to combine information from multiple resolutions in a manner which takes account of the importance and reliability of the sources of information used.

Further objects and advantages are to be able to implement the invention using statistical or neural network methods, to be able to carry out recognition using fewer training images than required for traditional neural approaches, to be able to achieve more accurate recognition performance by combining information from multiple resolutions in a manner more conducive to better performance than simple averaging, to be able to use different means of calculating the fuzzy densities (which are similar to weightings given to the information sources) during the combination of information and to be able to perform rejection of faces (or other objects) that are unknown as well as recognize faces (or other objects) that are known.

The above and other objects, features and advantages of the present invention will become clear from the following description of the preferred embodiment thereof, taken in conjunction with the accompanying drawings.

DESCRIPTION OF THE PREFERRED EMBODIMENT

An embodiment of the present invention will be described in detail while referring to the accompanying drawings.

Figure 3A:
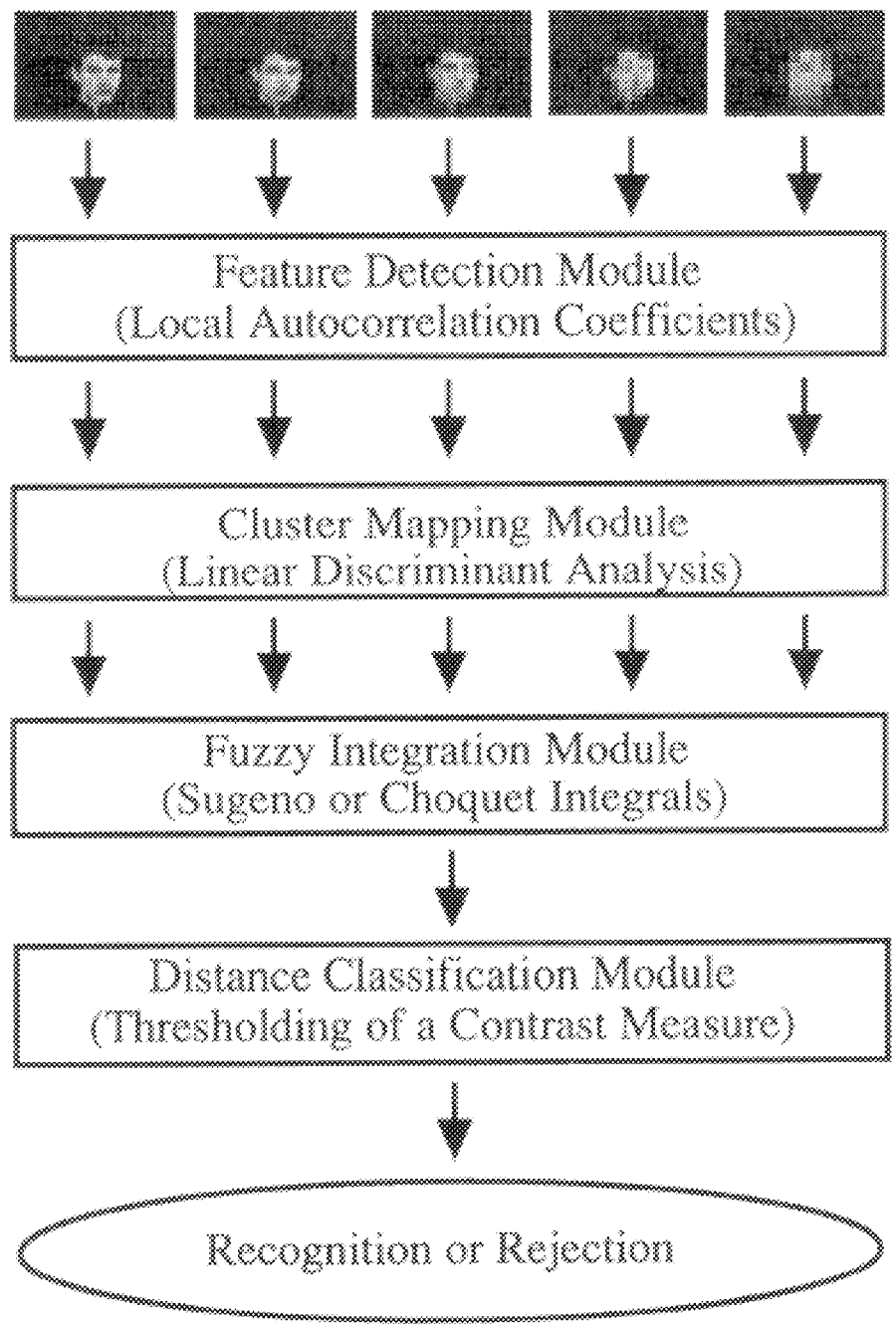
FIG. 3a is a schematic-diagram which gives an overview of the invention as applied to the recognition of an unknown person.

FIG. 3a is a flow chart which gives an overview of the present invention. The invention is shown processing one unknown image. The process for attempting to recognize many unknown images is simply to apply the same process to each image in turn. The invention is described with reference to FIG. 3a.

The invention employs images at multiple resolutions. The number of resolutions used must be greater than one. Each of the images can be generated from one original image by scaling the image using pixel averaging to shrink the image or may be obtained from multiple cameras or other image capturing means. The number of resolutions used has no theoretical limit if many machines are used to capture the images. In the case where the images are obtained by averaging of pixels, the number of resolutions may be limited by the image size if averaging of pixels produces smaller images or by the fact that averaging will eventually produce an image of only a single color. For the sake of clarity and to further the explanation, it is assumed here that the images are produced by pixel averaging, each averaging operation reducing the size of the image. Thus, if blocks of two pixels by two pixels are averaged all over the image and a new image made of these averaged results, the new image will be half the size of the image (approximately if the image breadth or height have an odd number of pixels). If theaverage is performed over three by three blocks, the new image will be approximately one third of the original size.

Alternatively, when averaging over two by two blocks, the block itself can be replaced by a block the same size having the average value in which case the image size will not shrink but the information content of the image will decrease. If averaging is performed over a block with a size of the minimum of the height and width of the image, the new resulting image will be an image which is comprised of solely one color. It is assumed that information around some of the edges of the image which would not be covered by a tiling of blocks of the relevant size is discarded although this is not to be taken as necessary or compulsory. The object is simply that images of precisely the same subject matter but at different resolutions are produced, the exact method of their production not being important to the operation of the invention.

In the next stage of the method, for each of the resolutions of the image, the local autocorrelation feature vector is calculated as described in the section 25 describing the prior art. This means that, in the case of, say, five resolutions, five element autocorrelation vectors will be generated which describe the unknown image at each of the five resolutions. This also limits the minimum size of the image since the image must have a size of at least three pixels by three pixels in order to apply the local autocorrelation method.

In the next stage of the method, each of the local autocorrelation feature vectors is transformed by multiplication with one of a set of mapping matrices which have been calculated by the method of linear discriminant analysis (sometimes called multiple discriminant analysis) and with respect to a training set of known faces as will subsequently be described. Thus, in the case of five resolutions of the same image, there are five mapping matrices, which have been generated from training data at the same resolution. Application of the mapping matrices has the effect of transforming the feature vectors into new feature vectors, not necessarily of the same size.

The invention has stored a set of vectors for each resolution which are called the cluster centers and which represent the averaged features for each of the known faces after transformation by the mapping matrix for that resolution. This allows a series of distances to be calculated between the mapped vector corresponding to the unknown face card and each of the cluster centers. The distance used is the Euclidean distance which is the square root of the sums of the squares of the differences in the elements for each element in a vector and a second vector although some other distance measure could be used.

Thus, for each resolution and for each of the cluster centers at that resolution, a distance between the mapped feature vector and each of the cluster centers can be calculated. For each esolution, there will be as many distances as there are known faces. We use the formula $$h_i^k = \frac{1/d_i^k}{\sum_{i=1}^{P} 1/d_i^k} \quad (19)$$

suggested by Xu, Krzyzak, Suen in "Methods of combining multiple classifiers and their applications to Handwriting Classification" (IEEE Transactions on Systems, Man and Cybernetics, volume 22, pp 419–435, 1992) to convert the distances d into measurements h in the range [0,1] for resolution k given p distances d indexed by i. This means that the distances for each resolution are transformed into a series of characterizing numbers between zero and one in which the larger the number is, the more likely the identity of the person in the unknown image corresponds to the known face corresponding to the largest value. The above formula is simply a means of transforming distances which range from zero to infinity to numbers in the range zero to one which can be used for fuzzy integration using Sugeno integrals. The use of this formula is not meant to be restrictive or compulsory and the requirement that the values lie between zero and one does not apply to some kinds of fuzzy integration such as Choquet integration.

The sets of numbers are now combined using fuzzy integration of Sugeno or Choquet or some other type with respect to a fuzzy measure as will be subsequently described. For example, in the case where there are five sets of distances corresponding to five resolutions, there will be one number in each set which corresponds to each of the known faces. Thus, if there are, say, sixty known faces, there will be sixty numbers in each set. Each of these numbers will lie in the range zero to one and the size of the number varies as the similarity of the unknown image to the known face which gave rise to that number. For each known face in turn, the numbers corresponding to that known face are combined using fuzzy integration to reduce the five sets to one set of combined numbers in which, again, the larger a number is, the more the unknown face resembles the known face that gave rise to the number. In other words, if there are five resolutions, the numbers for each face are combined to produce a new number. Thus, the total number of classifying numbers would be reduced by five in the case of five resolutions. This will subsequently be described in more detail.

Having a single set of numbers, one number for each of the known faces, the actual recognition or rejection stages are now performed on this sequence of numbers. Either the largest number can be taken as the most likely face or the reciprocals of the numbers can be used in which case the smallest of these (reciprocal) numbers will give the best matching face or some function of the numbers can be used which will give a measure of the most likely face. For the case of rejection, thresholding of the numbers or of the reciprocals of the numbers or of the function which is applied to the numbers for recognition can be used for rejection of unknown faces as will subsequently be described in more detail.

In overview then, the invention corresponds to the use of multiple recognition procedures, as described in prior art, but incorporating a combination step using fuzzy integrals, and an associated training procedure therefor, to produce a single recognition procedure which carries out recognition and rejection with the benefit of information from multiple resolutions.

For example, in the case o^ five resolutions, this corresponds to five of the recognition procedures comprised of local autocorrelation coefficients and linear (or multiple) discriminant analysis being run in parallel on the same image at the five resolutions, the distance vectors that would usually be thresholded then being manipulated and subsequently combined using fuzzy integration to result in compounded or combined results whose values can then be searched for the optimum recognition value by some function such as minimum or maximum and which can then be thresholded in the usual way to achieve the recognition of known faces and rejection of unknown faces.

We will now describe each of the components given in FIG. 3a in more detail.

Figure 1A:
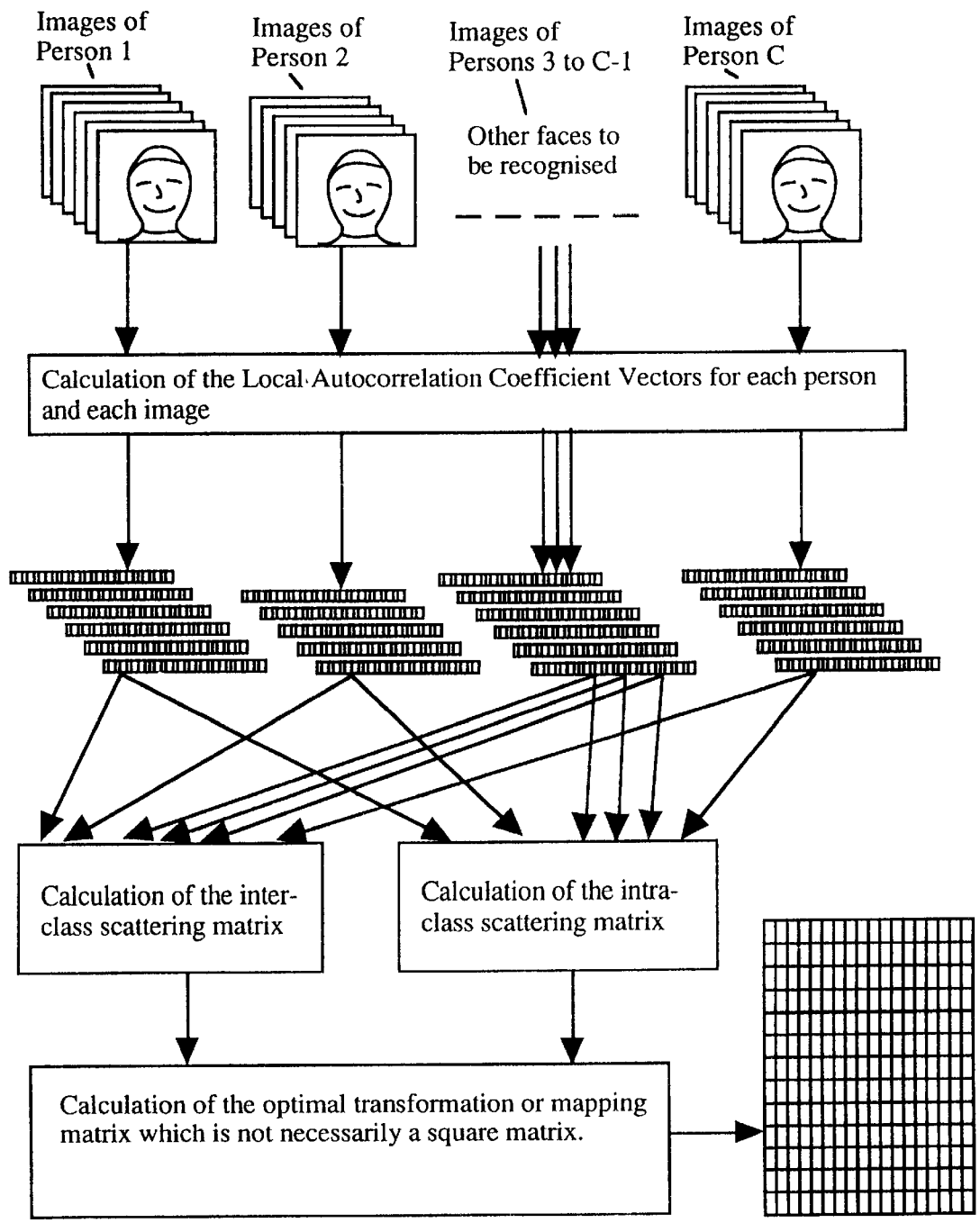
FIG. 1a is a schematic diagram of the processes in the closest related system during the training stage in which the mapping or transformation matrix is calculated.
Figure 1B:
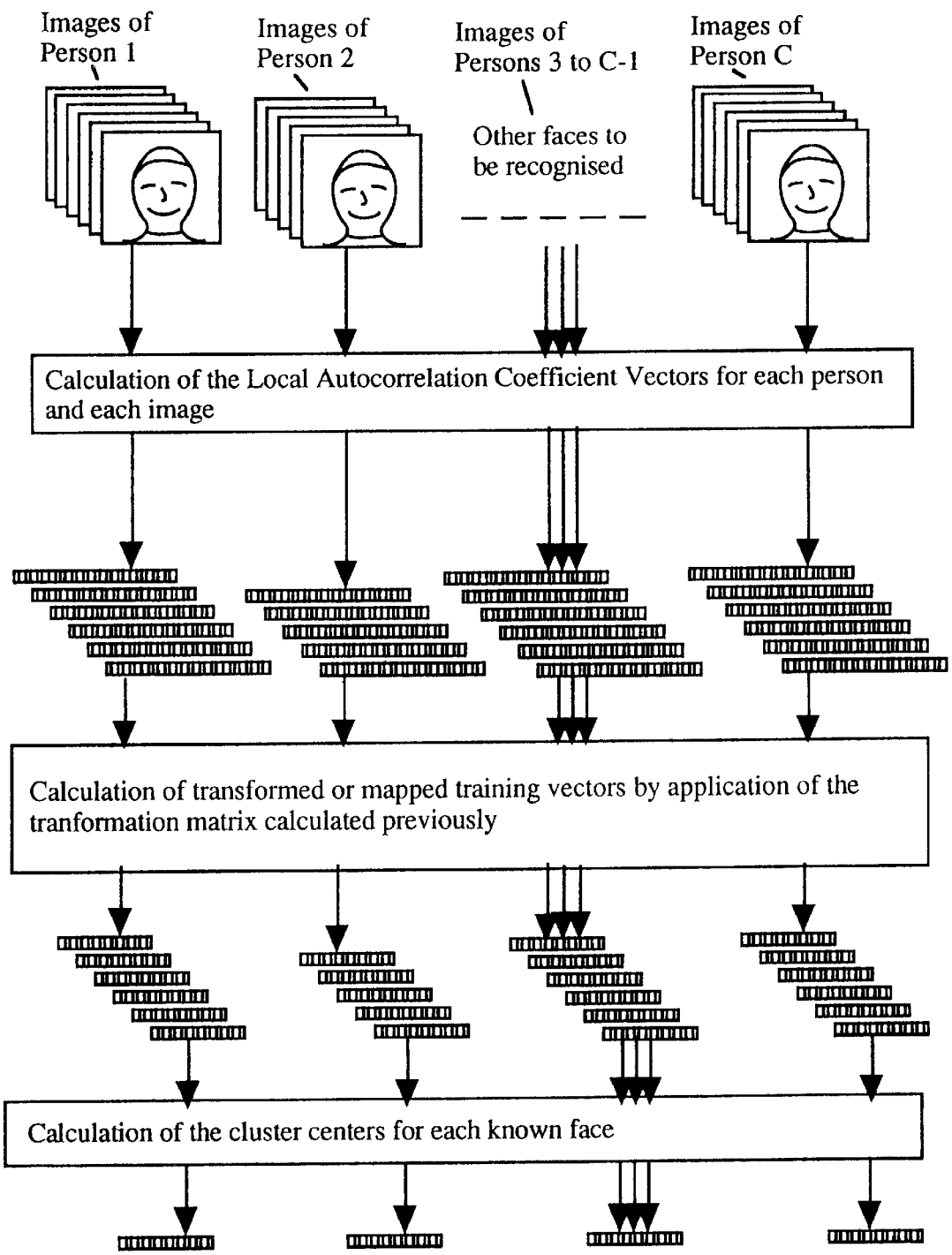
FIG. 1b is a schematic diagram of the processes in the closest related system during the training stage in which the cluster centers of the known faces are calculated after application of the previously calculated mapping.
Figure 1C:
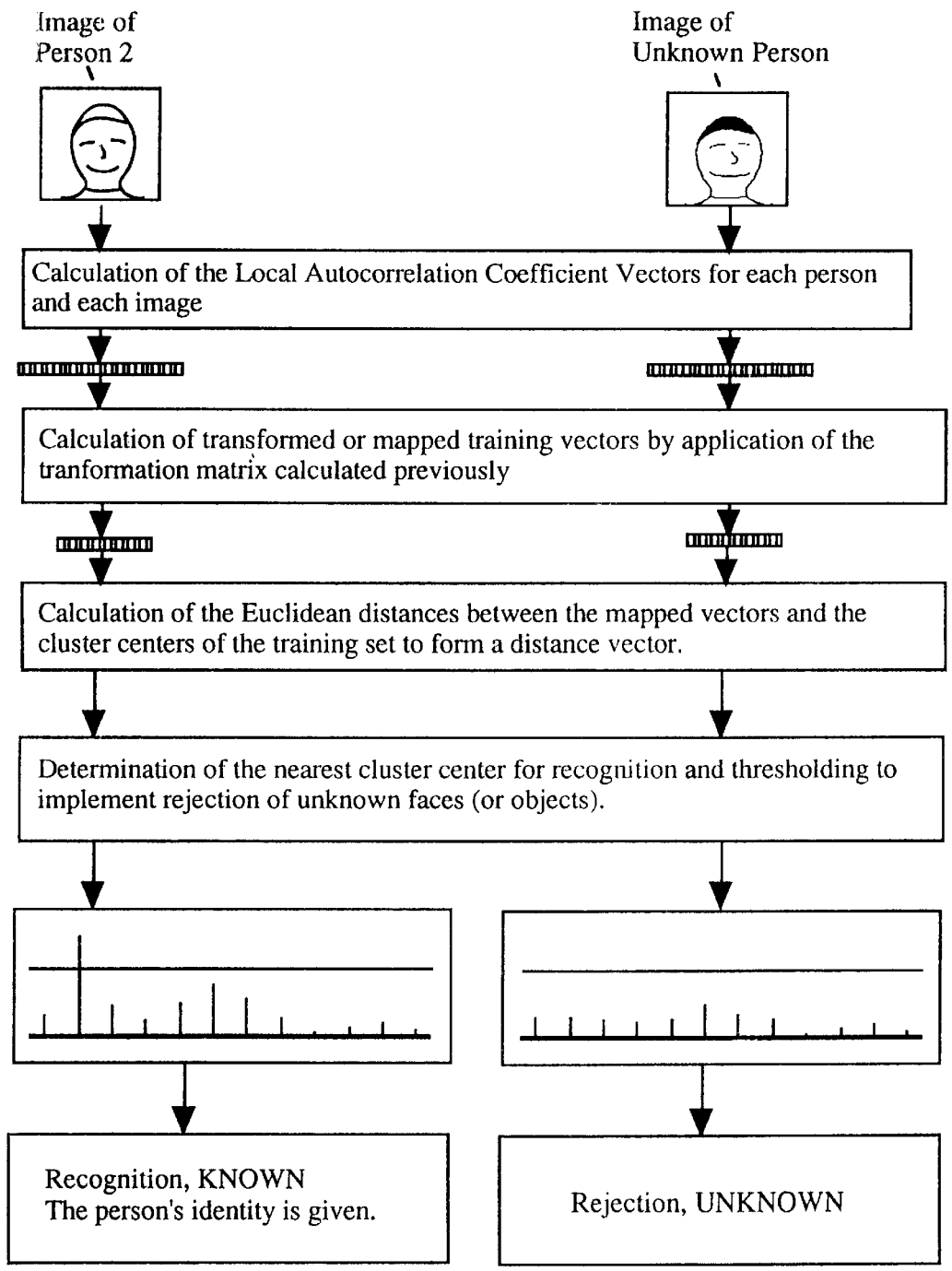
FIG. 1c is a schematic diagram of the processes in the closest related system during the testing stage for two faces, one known and the other unknown.
Figure 2:
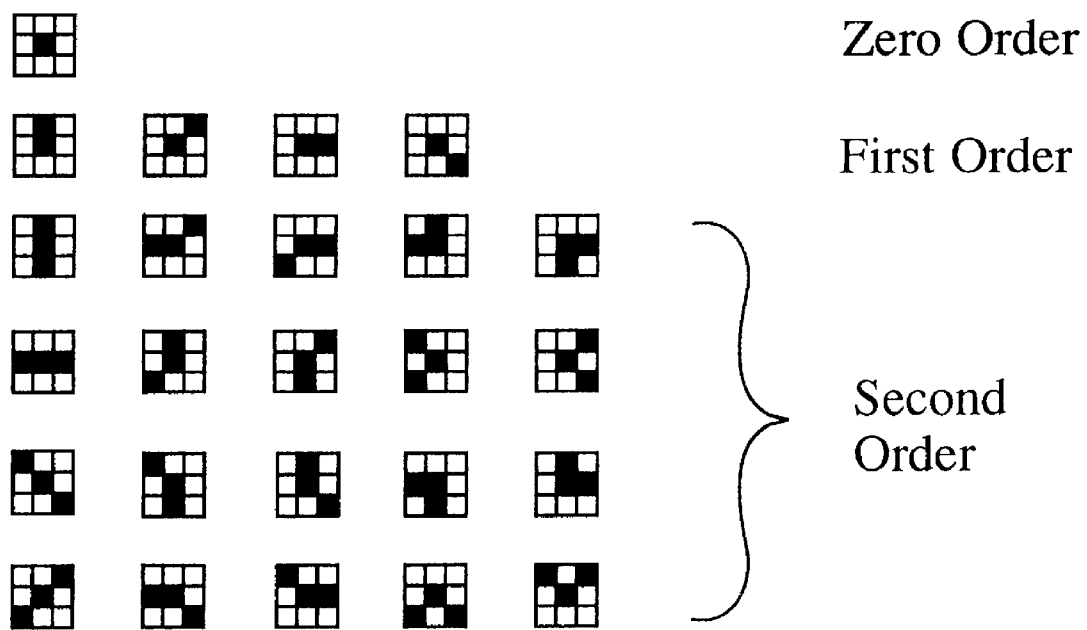
FIG. 2 is a diagram of a the local autocorrelation kernels. Black squares represent mask areas of value 1; white areas represent mask areas of value 0.

The first element in the diagram is feature detection. This operates as described in the section on prior art. The masks shown in FIG. 2 are scanned over the image. Wherever there is a black square, the gray value under that black square is multiplied with the other values under the black squares in that mask, the mask being scanned over the image and the values produced being summed and then divided by the normalizing factor, this process taking place for each of the twenty-five masks shown and this procedure being as described in equations (11), (12) and (13). This procedure is entirely as described in prior art. It is pointed out here that there may be some advantage in using what is called kernel dilation by Goudail, Lange, Iwamoto, Kyuma and Otsu in "Fast face recognition method using high order autocorrelations" (Proceedings of the International Joint Conference on Neural Networks, Nagoya, pp 1297–1300, 1993). This refers to using the same kernels as shown in the diagram but spaced over blocks of five by five, seven by seven, nine by nine, and so on. In the five by five case, for example, the mask which looks like a diagonal of a matrix in which the topleft, center and bottom-right squares are black and the rest white would, in the five by five case, have the top-left, center and bottom-right squares black. This can be thought of as multiplying the couples given in equation (5) by a whole number greater than or equal to one. Corresponding charges need to be made to the scaling value. Since this is not necessarily part of the invention, its use is merely mentioned here.

The next element in diagram 3a is that of a matrix transformation generated by linear discriminant analysis. The process of calculating the optimal mapping matrix from training data has already been explained in the section describing the prior art. It consists of the calculation of the inter- and intra-class scattering matrices for the classes which correspond to all of the known faces. Each known face corresponds to a class and there must be at least two classes. Limitations in the method mean that with an insufficient number of samples, the correct matrix calculation cannot be performed. This is a well known problem with this method and it is mentioned in passing for the sake of completeness.

This calculation, together with the characterization by local autocorrelation coefficients are performed exactly as described in the prior art. The result of these calculations is a matrix which is used to map feature vectors at a particular resolution together with a set of mapped feature vectors corresponding to the averaged feature vectors for each class.

Again, this is exactly as described in the prior art save that the distance measurements are the final product of this section rather than the intermediate value which is then used in the recognition and rejection procedures.

Figure 3B:
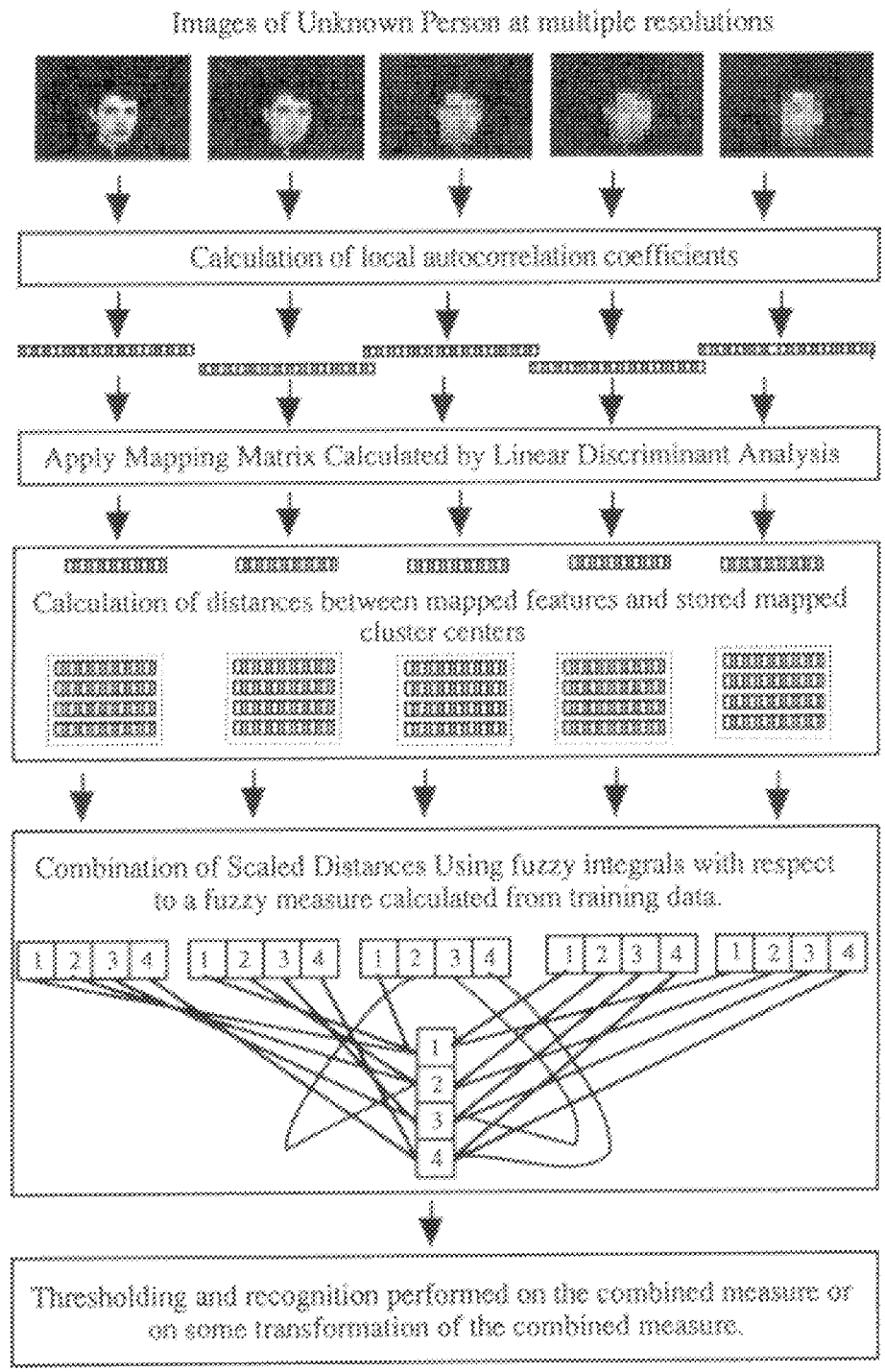
FIG. 3b is a schematic-diagram which gives a more detailed view of the invention during the processing of an image of an unknown face.

The next element in diagram 3a is fuzzy combination of the distances from each resolution to form a set of combined distances for each known face. As has already been described, at this stage, for each unknown image, the result of previous processing is several sets of distances, one set corresponding to one resolution and each distance corresponding to the distance between the unknown face and the faces in the set of known faces at that resolution. The distances are transformed into characterizing numbers using formula (19). In the case of these numbers, the larger the number is, the closer the face corresponding to the number is to the unknown face. Thus the position is as shown in FIG. 3b. In this diagram, each of these sets of numbers are shown as vectors in which the first element of each vector corresponds so the first known face, the second element of each vector corresponds to the second known face and so on, there being, in this case, four known faces. Elements are taken from the five vectors as shown and combined using fuzzy integration of Sugeno or Choquet type to form a new single vector. The use of Sugeno or Choquet integrals is not meant to be restrictive or compulsory. The fuzzy measure used in the calculation is calculated from additional training data as will be subsequently described. Once the combination is performed, the resulting vector may be treated in a similar manner to the single vectors of distances produced by each of the resolutions in the case described in the prior art.

The final procedure in diagram 3a is described as distance classification. If the reciprocals of the characterizing numbers are taken, the largest number in the set of characterizing numbers will become the smallest number. Thus the smallest reciprocal number is taken as the best match. If the reciprocals of the numbers are not taken, the largest number is taken as the best match. Better results can be obtained, by using a contrast measure $$cont = \frac{d_2 - d_1}{d_1 + d_2} \quad (20)$$

where $d_2$ and $d_2$ are the shortest and the second shortest distances (or reciprocal classifying numbers) respectively as measured in the recognition space as shown by Goudail, Lange, Iwamoto, Kyuma and Otsu in "Fast face recognition method using high order auto-correlations" (Proceedings of the International Joint Conference on Neural Networks, Nagoya, pp 1297–1300, 1993). If the classifying numbers themselves are used, the formula needs to be modified appropriately to give a positive number by using the following formula:

$$cont - \frac{d_1 - d_2}{d_1 + d_2} \quad (21)$$

Thresholding of this contrast measure rather than the reciprocals of the classifying numbers or of the classifying numbers themselves can be used for recognition, the advantage being that if the two closest cluster centers are at similar distances, or if the combined classifying numbers for the two most similar faces are of a similar size, then the contrast value given by the correctly applied formula chosen from (20) and (21) will help eliminate the case where no one match stands out from the others.

An overall view of the invention has now been given in which a description of several of its parts has been given. There remain several points which require further explanation before the method of operation is explained. These points are:

a) the derivation of the fuzzy measure from training data;

b) the method of fuzzy integration itself.

We will now go on to describe each of these points in turn.

The fuzzy measure is derived from training data. The invention requires three sets of images of faces in order to operate. The first set of images is the set of images of known faces. For each resolution, there is a local autocorrelation feature extraction step followed by a linear discriminant analysis step which uses the features calculated at that resolution. This can be thought of as multiple copies of the recognition system described in the prior art being run in parallel, each at a different resolution, each resolution looking at the same image but in a different amount of detail. Once the training has been performed on the first set to obtain the mapping matrix, the mapped cluster centers are also obtained by applying the mapping matrix to the averaged features corresponding to the images for each face.

A second set of images is then required to train the fuzzy combination procedure. This set needs to have different images of faces in the first set as well as images not previously seen by the system. The set of images is shown to the sets of recognition systems as described in the prior art to collect data on the performance of each of the classification systems at each resolution and for each face.

We define the recognition rate for a classification system or for a classification system with respect to a particular face as the percentage of known faces which are correctly recognized. We define the false access rate as the percentage of unknown faces which are falsely claimed to be recognized by a system. We do not use data on the number of known faces which are incorrectly recognized as another different known face. Denoting the recognition rate as rec and the false access rate as far, we ran define the formula $$g_{ij} = 1 - \sqrt{(far_{ij}^2 + (1 - rec_{ij})^2)/2} \quad (22)$$

as a means of calculating (raw) fuzzy densities $g_{ij}$ where one of the indices refers to the known face and the other to the classifier (which can also be thought of as the resolution) for each face and for each classifier Equation (22) states that the fuzzy density for a particular resolution and for a particular known face is given by one minus the square root of half of the sum of the squares of the false access rate for the face at that resolution and the square of one minus the recognition rate for that face at that resolution. The recognition rate is the percentage of the images of known faces at a particular resolution that were correctly recognized and the false access rate is the percentage of unknown faces who were incorrectly recognized as that face. These fuzzy densities are only raw fuzzy densities because before they are used, they undergo further processing as will now be described.

Two kinds of processing have been tried on the fuzzy densities giving similar results. To label them, we call them normalize-by-file and normalize-by-face.

In the case normalize-by-file, we sum all of the values, then set all zero values to an arbitrarily chosen negligible value (currently $10^{-20}$), then divide each of the matrix values by the sum. All values are then multiplied by the number of known faces and by a user-chosen scaling factor. The negligible value is to correct for the case where at least three of the fuzzy densities for each face are zero. In this case, the solution method for λ given by equation (10) fails. Moreover, if the fuzzy density for a classifier is zero, the classifier is not considered in the fusion or merging process. The user-chosen scaling value is chosen to maximize the performance of the system in a manner to be subsequently explained.

In the alternative scaling method, normalize-by-face, for each of the known faces, we sum the values, perform the replacement of zeros as before, divide all values by the sum and finally multiply all values by the given scaling parameter directly. The values obtained are of comparable sizes to those found by the normalize-by-file method.

Other alternatives to these scaling methods exist but these two methods have been shown to perform better than the others tested so far. Their use is not meant to be restrictive or compulsory although some form of scaling is required when the raw fuzzy densities are derived from training data in the manner described.

The value of the user defined scaling parameter is decided as follows. During the testing on the third test set, the value of the scaling parameter is adjusted to give the best possible recognition results as measured by the score defined by the following equation $$\text{score} = 1 - \sqrt{\frac{\text{far}^2 + (1 - \text{rec})^2}{2}} \qquad (23)$$

where the false access rates and recognition rates refer this time to the performance of the system over the test data, namely the data in the third test set. This optimization may be seen by drawing a graph of score versus scaling parameter and may be automatically chosen if required.

Figure 3C:
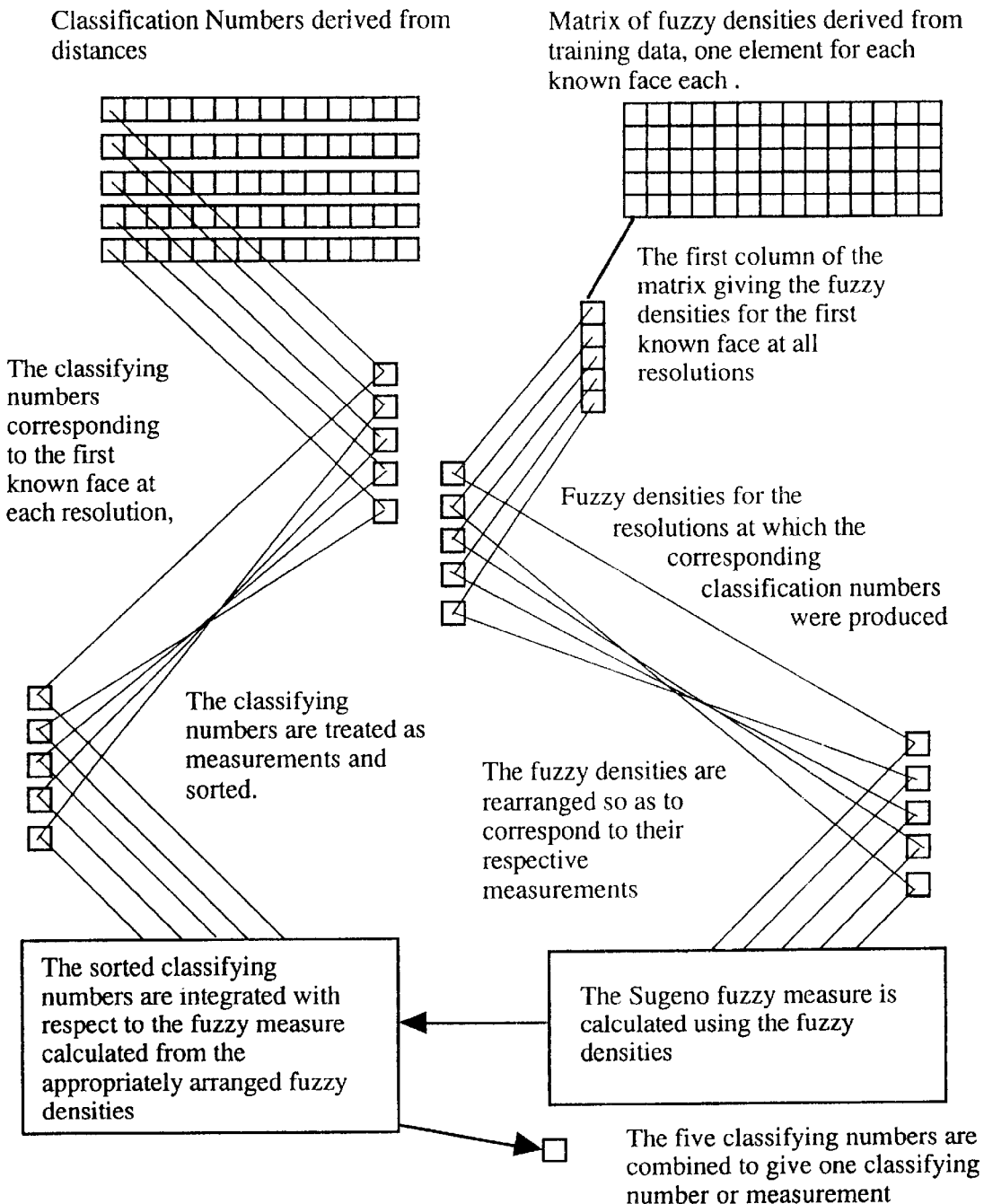
FIG. 3c is a schematic-diagram which gives a detailed view of the process of fuzzy integration.
Figure 3D:
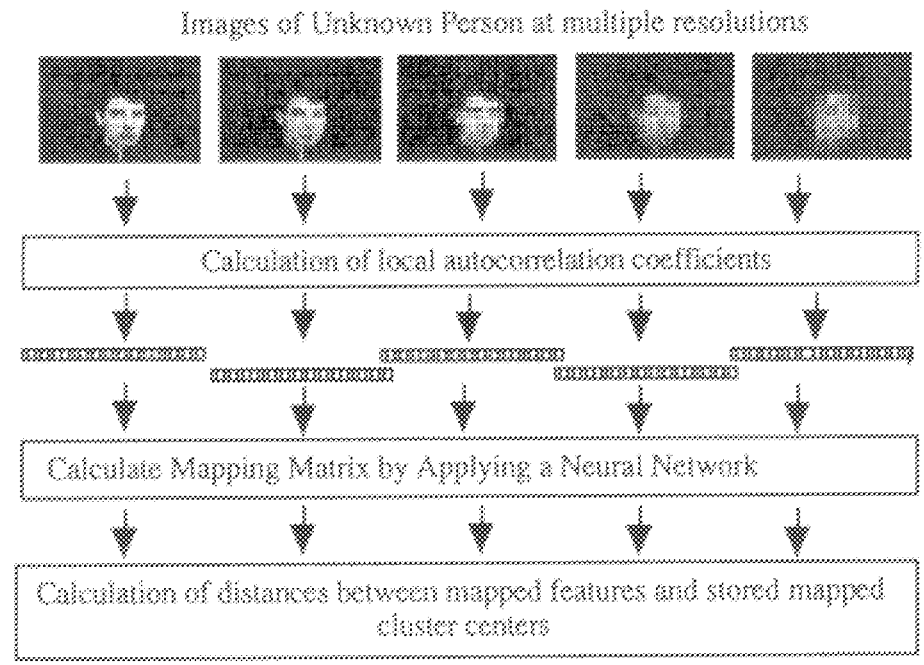
FIG. 3d is a schematic-diagram which shows two areas where neural networks may be applied to transform the data.
Figure 3D:
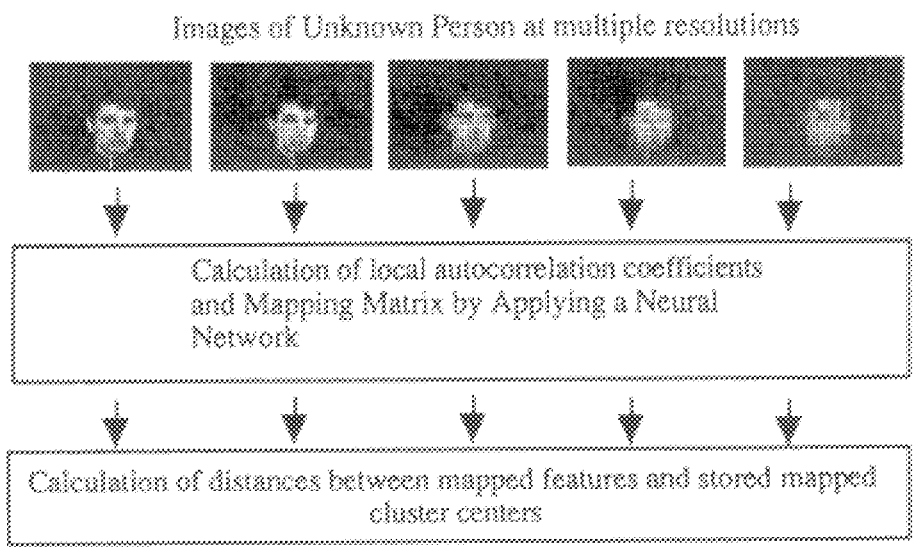

The method of fuzzy integration itself will now be described. The process of fuzzy integration is shown in FIG. 3c. In this diagram, the particular numbers of 5 resolutions and 14 known faces have been used in the diagram for the purpose of illustration and to make the explanation of the method clearer. This is not meant to constitute a limitation, and indeed the invention performs well with larger numbers.

In diagram 3c, the combination of five sets of classifying numbers lying between zero and one with respect to a set of fuzzy densities is shown. There are five sets of classifying numbers because, for this example, five resolutions are being used. The matrix of fuzzy densities has five rows corresponding to the five resolutions. Each of the vectors of classifying numbers has 14 elements and the matrix of fuzzy densities has 14 columns corresponding to the use of 14 cluster centers which in turn corresponds to the use of 14 known faces or 14 sets of known facial images. For the purposes of the illustration, and without loss of generality, it is assumed that the elements in the vectors and matrix are ordered such that elements in corresponding columns correspond to the same known face. Thus, the elements in the leftmost position of the vectors of classifying distances all correspond to the first unknown face as does the first column of the matrix of fuzzy densities. Moreover, it is assumed that the resolutions at which the characterizing numbers and fuzzy densities were calculated correspond so that the first vector corresponds to the top row of the matrix of fuzzy densities, the second row of the matrix of fuzzy densities corresponds to the resolution at which the second vector of characterizing numbers was characterized and so on. The method of fuzzy integration of the classifying numbers corresponding to the first known face will be explained. The method of combination for all of the other 13 known faces in this example being merely a repetition of this procedure working column-wise along the data.

The first elements of each of the vectors of classifying numbers and the first column of the matrix of fuzzy densities are required to integrate the information for the first known face, the output of the procedure being a single number. The element from the topmost row and leftmost column of the matrix corresponds to the leftmost entry of the first vector and so on for each of the rows of the matrix as has already been explained. Thus, the first element of the first vector and the element in the first row and first column of the matrix can be thought of as a pair. Correspondingly, the first element of the second vector and the element in the second row and first column of the vector can be thought of as a pair and so on for the other three vectors and rows in the diagram.

The first operation to be performed is the sorting of these pairs into increasing order according to the magnitude of the classifying numbers. That is, each of the pairs will be sorted so that the pair members which correspond to the measurements or classifying numbers will be in increasing order of magnitude even though the elements for the fuzzy densities will be in no particular order save for their association with their corresponding classifying number.

The next step that is required is the solution of equation (10) using the fuzzy densities from the matrix to solve for $\lambda$. This solution permits the fuzzy measure to be calculated using equation (8). If we denote the sources, that is the classifiers at each of the five resolutions by S1, S2, S3, S4, S5, and assume, for the purposes of illustration that they are ordered by size of increasing measurement in the order S5, S3, S2, S1, S4, then only the fuzzy measures for the sets of sources {S5, S3, S2, S1, S4}, {S3, S2, S1, S4}, {S2, S1, S4}, {S1, S4} and {S4} need be calculated. These measures can be calculated by application of formula (8) starting with the set {S4} and working backwards through the list. It is now possible to apply equations (3) and (4) to calculate the Sugeno or Choquet integrals as required. By applying this procedure in turn to each of the columns of the matrix with the corresponding elements of the vectors, a vector of fuzzy integrals can be calculated which may then be used in the recognition and rejection steps as previously described. This procedure is described in the reference by Tahani and Keller "Information Fusion in Computer Vision Using the Fuzzy Integral" (IEEE Transactions on Systems, Man, and Cybernetics, 20(3) pp 733–741, 1990) and its explanation is given here to aid the understanding of the invention.

This embodiment is applied to face recognition, but the present invention is not restricted thereto. Its use for recognition of animals or of machine parts or of vehicles has been suggested. It is a fully general image recognition system. The only requirements are that there be a sufficient number of images to permit the calculation of the eigenvalues and eigenvectors used in the linear discriminant analysis procedure, and that these images are in sets of multiple images for each individual object to be recognized.

The method of operation of the preferred embodiment, as described in the previous section, will now be given below.

Figure 4A:
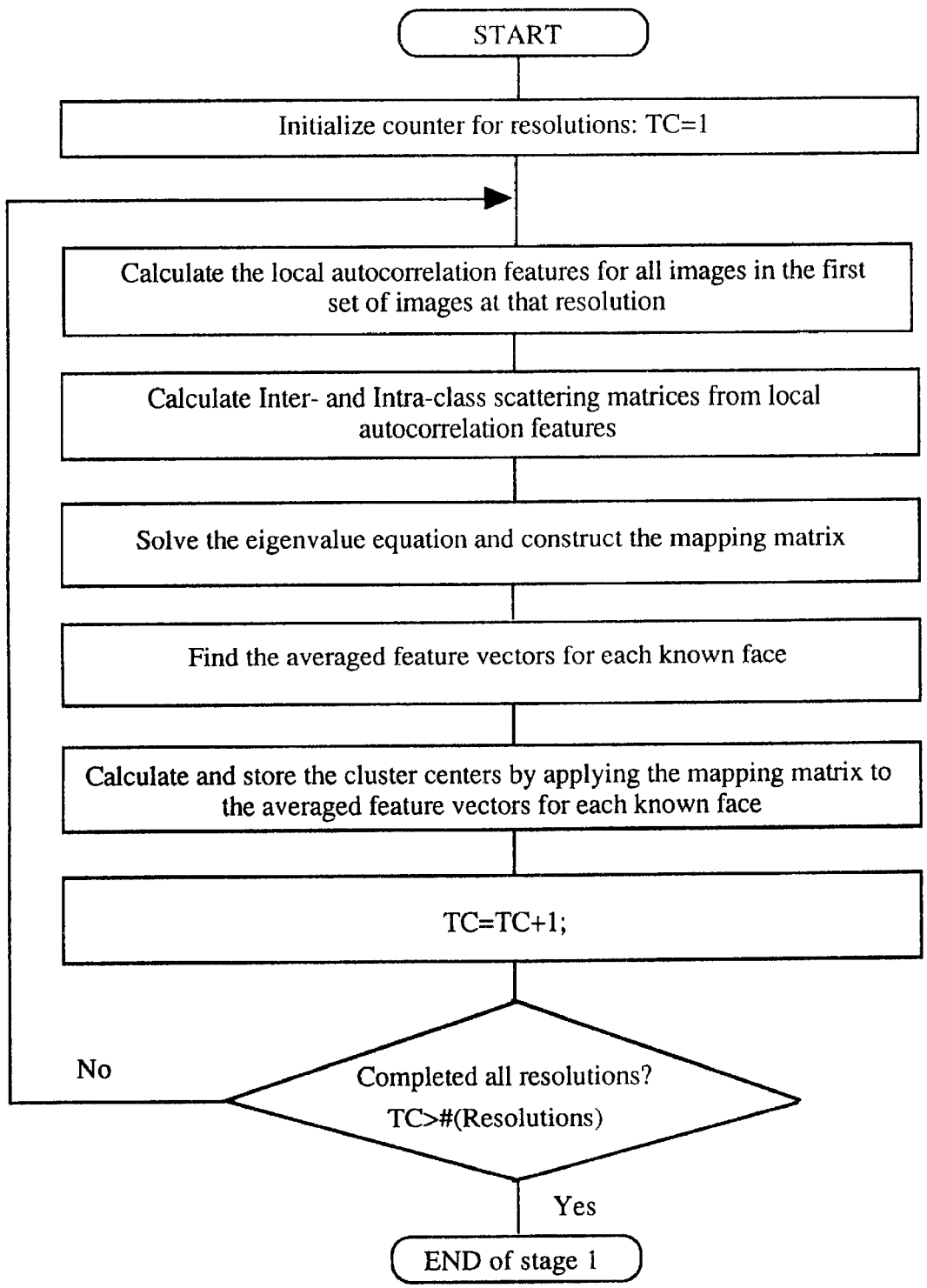
FIG. 4a is a flowchart of a face-recognition algorithm in part embodiment of the present invention during its first training stage.

Three sets of images (of faces or other objects) are used during the operation of the invention. The first set, a training set, consists of multiple images of the faces to be learned by the system, each of these images themselves being present at multiple resolutions. These multiple resolutions are fixed during this training stage and so all other images from the other two sets must also be present at these resolutions. As an example, 50 images of sixty persons at five resolutions can be used to train the system. For each of the resolutions, training consists of characterization using local autocorrelation feature extraction, calculation of the inter- and intra-class scattering matrices and the calculation of the optimal transformation matrix. This optimal transformation matrix (one for each resolution) is then either applied to the average of the features for each class, that is each known image set or each known face, or the transformation can be applied to all features individually and the averaging of the features to form the cluster centers performed after the transformation. This is the same training scheme as described in the prior art and differs only in that this training scheme is run in parallel on multiple resolutions. This training is described in the flow-chart of FIG. 4a.

Figure 4B:
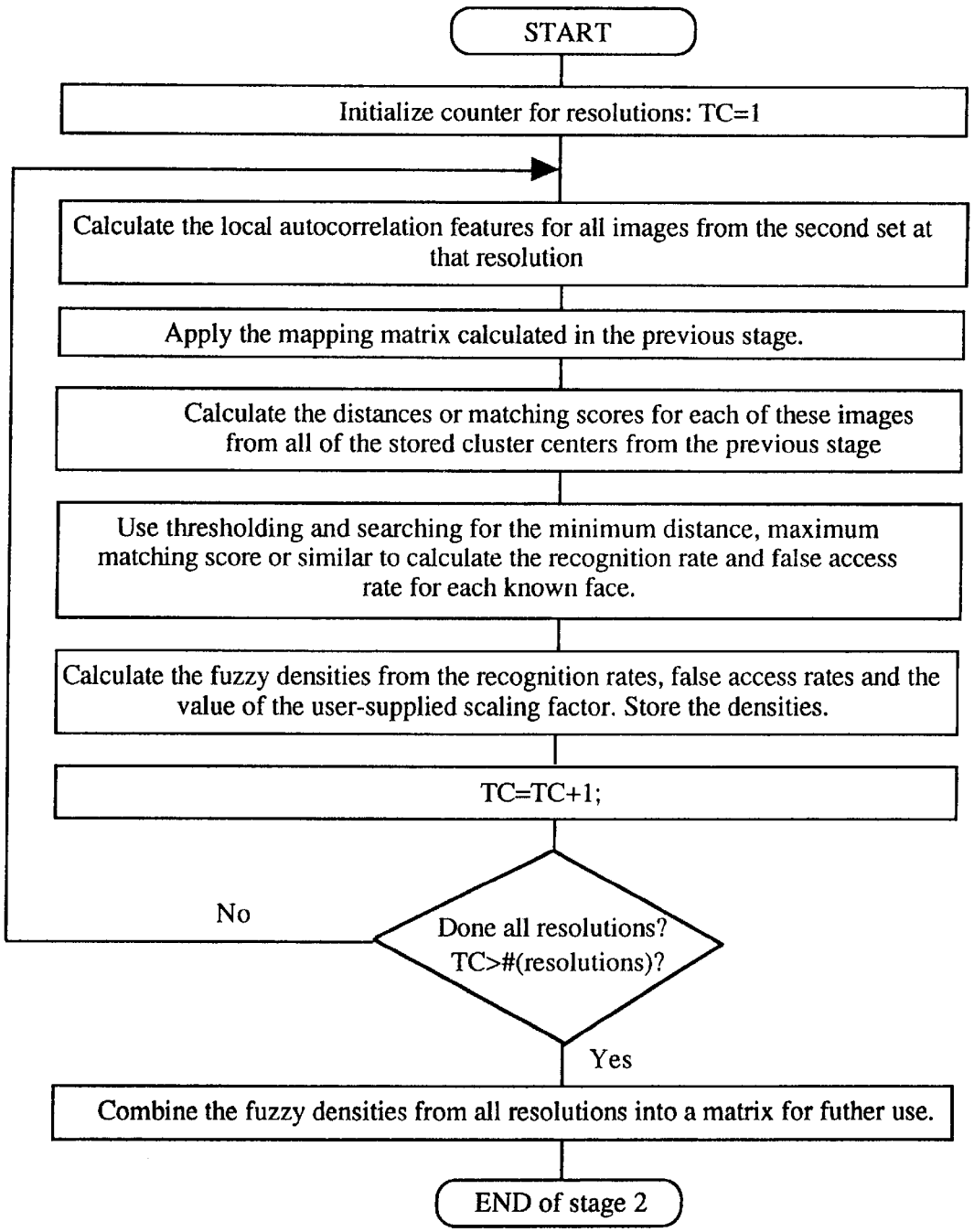
FIG. 4b is a flow-chart of the face-recognition algorithm in part embodiment of the present invention during its second training stage.

The second set of images is used to train the fuzzy combination procedure. This set of faces requires new or different images of the objects or faces in the first set as well as images of different objects or faces not present in the first training set. The recognition rate and false access rates of the classification systems comprising the local autocorrelation feature vector extraction procedures, the linear discriminant analysis procedures and the recognition procedures are calculated and combined using the formula (22). The recognition procedure is that in which the minimum of the distances is used for recognition and thresholding of the distances is used for rejection or alternatively those variants of this which have already been explained. This is equivalent to running multiple copies of the recognition system described in the prior art at multiple resolutions to gain a measure of the ability of these systems to recognize particular faces at particular resolutions. This step is as shown in the flow-chart of FIG. 4b.

Figure 4C:
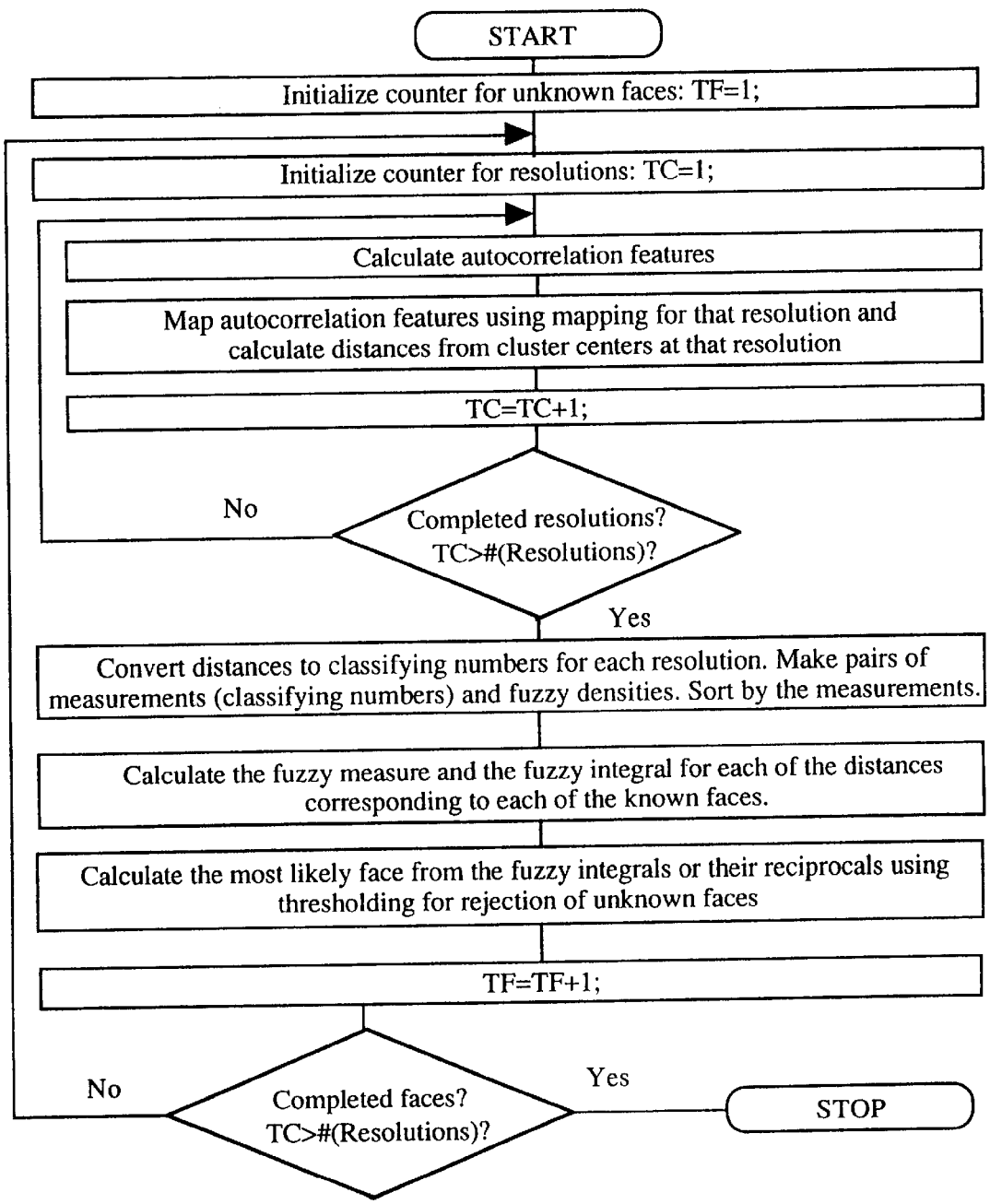
FIG. 4c is a flow-chart of the face-recognition algorithm in part embodiment of the present invention during its testing stage.

Finally, a third set of faces for testing purposes is required. There may be only one face in this third set, although multiple copies of this image at the different resolutions are required. However, for the purposes of collecting data about the performance of the system, it is helpful if this third set contains a third set of images of the objects in the first set as well as other images of objects which have not been previously seen by any of the systems, all of these images being present at the required multiple resolutions. The multiple sets of local autocorrelation feature extraction procedures followed by linear discriminant analysis procedures are run in parallel on the third set of images generating vectors of distances between the cluster centers of the known images and the unknown images. The following procedure is performed for each distinct image in the third set. Features generated from images of the same objects at the same orientation but different resolutions are combined by using fuzzy integration of the Choquet or Sugeno type, the fuzzy measure being employed being the Sugeno measure calculated from the training data obtained from the second training set. This combination involves a modification of the distances into classifying numbers as previously described and graphs of performance of the combined system are useful for discovering the correct user supplied scaling parameter to be used. The combined data is then fed into a recognition procedure of the same type as used in the second stage, the combined fuzzy integrals possibly being modified in the manner previously described to permit operation with the recognition procedure which was also previously describes. This stage of the procedure in which the third set of images are recognized is not given in the prior art and requires a method of training, a method of combination and a means of converting the classification distances into a form in which they can be used for combination. This final recognition step is as shown, in the flowchart of FIG. 4c.

The results of recognition can be displayed on a screen or a display or output to an appropriate control apparatus which may take one of the following forms but is not limited thereto. The results of the recognition procedure may be directed to controlling apparatus which:

a) is used for recognition of faces to permit the entry of the persons belonging to those faces to some secure area;

b) is used for the recognition of faces to permit the gathering of information concerning the whereabouts of persons attached to those faces by tracking their movements;

c) is used to compare a face captured and digitized by some image capturing means with an additional supplied image of that face such as might be inscribed or printed on a credit card or other document or item, the ownership of which need to be checked by machine.

In the case where the objects to be recognized are not faces, the controlling apparatus may have other functions. The controlling apparatus may be used for:

a) the recognition of those objects to permit sorting;

b) the recognition of those objects and their spatial alignment to permit manipulation in order to change their alignment;

c) the grading of objects of the same type with respect to some visual quality such as size.

These represent only a selection of possible controlling apparatus and these lists are not meant to restrict the incorporation of the process into other controlling apparatus as may be appropriate.

As described above, according to the present invention, a method of recognizing faces comprises several steps applied to three sets of images of faces. In the first step, the first set a images is used to train the invention to recognize the known faces of the first set at multiple resolutions, mapping matrices being generated by linear discriminant analysis from the local autocorrelation features representing the images at each of the resolutions. In other words, one mapping matrix will be generated for each resolution from all of the features calculated at that resolution. In the second step, the mapping matrices are applied to the local autocorrelation features for each of the images in the second set at the resolutions at which the mapping matrices were generated, at least some of these images being of persons also present in the first step and at least one image of each of the known persons being present in the second set. At each of the resolutions which are to be combined, the distances between the mapped averages of the features for each of the known persons at that resolution are calculated and a particular measure of their performance is used to calculate fuzzy densities and hence a fuzzy measure which can be used in the next step for combining the results. In the third step, the third data set is used for testing. Each image is treated as an unknown image and is classified without additional knowledge by the invention. A multiplicity of images can be used to measure the statistical performance of the system for comparison with other systems but only a single image (at multiple resolutions) need be used. The image, or images are classified at multiple resolutions by using the technique of local autocorrelation coefficients as before. The previously determined mapping matrices appropriate to the resolutions at which the characterizing features have been produced are applied to transform the characterizing feature vectors for the unknown image or images. Subsequently, the distance between the feature vectors for the unknown image or images and the cluster centers, which are the mapped averaged features corresponding to known persons, are calculated for each resolution. These distances are then converted into scores or pseudo-probabilities to be taken as the measurements produced by the sources which are the mapping matrices at each resolution. The distances, which have been converted into scores or pseudo-probabilities, are then combined using the Sugeno or Choquet integrals calculated with respect to a Sugeno or other measure. If the Sugeno measure is used, the fuzzy densities used to calculate the fuzzy measure are derived from the recognition rates and an error measure combined in a particular way as previously described. The result of this will be a series of scores, one for each known face and each classifier which describe the similarity or differences between the known faces and each of the unknown faces in the third test set. Recognition can then be performed by choosing the largest score, or smallest distance or some other means of choosing which of the known faces is most similar to each of the unknown faces with thresholding being employed to decide which faces are to be considered unknown.

Accordingly, the reader will see that this face or object recognition system can be used to recognize images of faces (or other objects) from a limited number of training images, these images not being required to be precisely aligned, scaled or normalized. The invention does not require that the faces (or other objects to be recognized) are localized within the image, does not require specialized images of faces, or of parts of faces or body parts for recognition, images of heads and upper torsos taken in a variety of poses and under no special lighting conditions sufficing to perform recognition. Indeed, having a variety of training images serves to improve the reliability of the invention.

Furthermore, the invention has the additional advantages that:

a) it can perform recognition without the requirement of using color images;

b) it can perform recognition using multiple resolutions in which the images at lower resolution can be derived from those at higher resolution by pixel averaging;

c) it can be implemented, in part at least, by using a neural network or a plurality of neural networks; and d) it does not require time-ordered sequences of images during its training or test stages although multiple images are required.

Although the description above contains many specifities, these should not be construed as limiting the scope of the invention but as merely providing illustrations of some of the presently preferred embodiments of this invention. For example, other methods of calculating the fuzzy densities which denote the importances of each of the resolutions can be employed, color images may be characterized, the method being applied separately to each of the color components and so on.

Thus the scope of the invention should be determined by the appended claims and their legal equivalents, rather than by the examples given.

What is claimed is:

1. A process for recognizing known images of a plurality of objects, the process comprising:

(a) obtaining a plurality of different resolutions for an unknown image;

(b) performing local autocorrelation for each resolution of the unknown image to produce a feature vector for each resolution;

(c) performing linear discriminant analysis for each feature vector, wherein each feature vector from the local autocorrelation is processed employing a transformation matrix, the transformation matrix being calculated with respect to known images required to be recognized, the linear discriminant analysis producing a plurality of outputs;

(d) performing fuzzy integration to merge the outputs from the linear discriminant analysis to produce a merged output for each of the known images, each merged output being indicative of similarity of the unknown image to each known image;

(e) analyzing each merged output to identify a known image corresponding to the unknown image.

2. The process according to claim 1 including calculating the transformation matrix using a neural network.

3. The process according to claim 2 wherein the known images are images of faces.

4. The process according to claim 1 wherein performing fuzzy integration comprises performing Sugeno fuzzy integration.

5. The process according to claim 4 wherein performing fuzzy integration comprises calculating a Sugeno fuzzy measure.

6. The process according to claim 4 wherein the known images are images of faces.

7. The process according to claim 5 wherein the known images are images of faces.

8. The process according to claim 1 wherein obtaining a plurality of different resolutions of an unknown image comprises obtaining multiple copies of the unknown image using an image gathering means.

9. The process according to claim 1 wherein obtaining a plurality of different resolutions of an unknown image comprises applying pixel averaging to the unknown image.

10. A process for evaluating the similarity of a plurality of collections of images and for classifying the collections of images with respect to a known collection of images of objects of the same class, each of the collections containing only images of the same object produced at different orientations and resolutions, the resolutions being known for each image and being the same between the collections of images thereby forming sets of images at differing resolutions, the process comprising:

(a) obtaining a plurality of different resolutions of an image to produce a collection of images to be classified;

(b) providing a plurality of first modules implementing local autocorrelation coefficient feature extraction and providing a plurality of second modules implementing linear discriminant analysis and equal in number to the first modules, each of the first modules providing an output to each of the second modules to form pairs of modules, the second modules storing information characterizing a collection of known images of objects of the same class, the second modules providing information on similarity of images from the collection of images to be classified to the collection of known images, the pairs of local autocorrelation feature analysis modules and linear discriminant analysis modules operating only at resolutions of known and predetermined accuracy for both images of the collection of images to be classified and the collection of known images;

(c) providing a third module for integrating outputs from the pairs of local autocorrelation feature extraction modules and linear discriminant analysis modules, and for merging information from the pairs of modules operating at multiple resolutions, the third module performing fuzzy integration;

(d) training the third module, including measuring the performance of the pairs of local autocorrelation feature extraction modules and linear discriminant analysis modules to provide performance measurement;

(e) combining the output of the pairs of local autocorrelation feature extraction modules and linear discriminant analysis modules based on the performance measurement;

(f) producing an output similar to an output produced by one of the pairs of local autocorrelation coefficient feature extraction modules and linear discriminant analysis modules; and (g) providing a fourth module for analyzing the output from the third module such that recognition of images from the collection of images to be classified or rejection of the collection of images to be classified is effected relative to the images from the collection of known images, an output of the fourth module being an identification of each of the images from the collection of images to be classified as being similar to images from the collection of known images or as being different from the images in said collection of known images, wherein the pairs of local autocorrelation feature extraction modules and linear discriminant analysis modules in conjunction with the third module and the fourth module permit recognition or rejection of the images from the collection of images to be classified, the recognition or rejection being with respect to the collection of known images, the recognition or rejection having higher performance measurement than a performance measurement of any one of the pairs of local autocorrelation feature extraction modules and linear discriminant analysis modules in conjunction with one of the modules for implementing rejection or recognition.

11. The process according to claim 10 wherein the pairs of local autocorrelation feature extraction modules and linear discriminant analysis modules are implemented by at least one neural network.

12. The process according to claim 10 wherein the collection of known images are images of faces.

13. The process according to claim 11 wherein the collection of known images are images of faces.

14. The process according to claim 10 wherein the third module is implemented by Sugeno integration.

15. The process according to claim 11 wherein the third module is implemented by Sugeno integration.

16. The process according to claim 14 wherein a fuzzy measure employed in the fuzzy integration is a Sugeno fuzzy measure.

17. The process according to claim 15 wherein a fuzzy measure employed in the fuzzy integration is a Sugeno fuzzy measure.

18. The process according to claim 16 wherein the collection of images to be classified are images of faces.

19. The process according to claim 17 wherein the collection of images to be classified are images of faces.

20. A process for recognizing an unknown image with respect to sets of known stored images comprising:
   (a) obtaining a plurality of different resolutions of the unknown image;
   (b) performing location autocorrelation coefficient feature extraction followed by linear discriminant analysis for each resolution of the unknown image to produce a plurality of outputs;
   (c) combining the plurality of outputs into groups for each set of known stored images using fuzzy integration and producing a classifying number for each group;
   (d) performing recognition or acceptance of the unknown image by examining the classifying number and comparing the classifying number to a threshold; and
   (e) training the step of combining such that the plurality of outputs for the plurality of resolutions are combined in a manner other than averaging.

21. The process according to claim 20 wherein performing local autocorrelation includes using at least one neural network.

22. The process according to claim 21 wherein combining the outputs includes performing Sugeno fuzzy integration using a Sugeno fuzzy measure.

23. The process according to claim 21 wherein the unknown image is an image of a face.

24. The process according to claim 22 wherein the unknown image is an image of a face.

25. The process according to claim 22 wherein the unknown image comprises an image of a machine part.

* * * * *